(12) United States Patent
Kmita et al.

(10) Patent No.: US 6,513,688 B2
(45) Date of Patent: Feb. 4, 2003

(54) PICKUP TRUCK BED EXTENDER APPARATUS

(75) Inventors: Gerard J. Kmita, Allen Park, MI (US); Jeffrey M. Aftanas, Ortonville, MI (US); Donald L. Muñoz, Bloomfield, MI (US); James W. Alexander, Birmingham, MI (US)

(73) Assignee: JAC Products, Inc., Ann Arbor, MI (US)

( * ) Notice: Subject to any disclaimer, the term of this patent is extended or adjusted under 35 U.S.C. 154(b) by 77 days.

(21) Appl. No.: 09/855,282

(22) Filed: May 15, 2001

(65) Prior Publication Data

US 2002/0023938 A1 Feb. 28, 2002

Related U.S. Application Data

(63) Continuation-in-part of application No. 09/702,008, filed on Oct. 30, 2000, which is a continuation-in-part of application No. 09/429,613, filed on Oct. 29, 1999, now abandoned.

(51) Int. Cl.$^7$ ................................................. B60R 9/00
(52) U.S. Cl. ........................ 224/403; 224/498; 224/500; 224/503; 296/26.11; 296/37.6
(58) Field of Search ................................ 224/402, 403, 224/404, 488, 495, 497, 498, 500, 503, 504, 506, 509, 525, 526; 296/26.01, 26.08, 26.11, 37.6, 57.1

(56) References Cited

U.S. PATENT DOCUMENTS

| | | |
|---|---|---|
| 797,900 A | 8/1905 | Lowry |
| 1,919,063 A | 7/1933 | Hubbard |
| 2,729,499 A | 1/1956 | Eggum |
| 2,852,303 A | 9/1958 | Hopson |
| 2,872,239 A | 2/1959 | Bowness et al. |
| 3,632,153 A | 1/1972 | Knudsen |
| 3,902,599 A | 9/1975 | Stromberg |
| 4,023,850 A | 5/1977 | Tillery |
| 4,136,905 A | 1/1979 | Morgan |
| 4,472,639 A | 9/1984 | Bianchi |
| 4,531,773 A | 7/1985 | Smith |
| 4,778,213 A | 10/1988 | Palmer |
| 4,824,158 A | 4/1989 | Peters et al. |
| 4,830,242 A | 5/1989 | Painter |
| 5,083,829 A | 1/1992 | Fonseca |
| 5,123,691 A | 6/1992 | Ginn |
| 5,147,103 A | 9/1992 | Ducote |
| 5,154,470 A | 10/1992 | Bringman, Jr. |
| 5,201,562 A | 4/1993 | Dorsey |
| 5,253,913 A | 10/1993 | Metivier |
| 5,328,225 A | 7/1994 | Melching et al. |
| 5,468,038 A | 11/1995 | Sauri |
| 5,560,525 A | 10/1996 | Grohmann et al. |
| 5,658,033 A | 8/1997 | Delaune |
| 5,678,743 A | 10/1997 | Johnson et al. |
| 5,700,047 A | 12/1997 | Leitner et al. |
| 5,752,636 A | 5/1998 | Manley |
| 5,752,800 A | 5/1998 | Brincks et al. |
| 5,775,759 A | 7/1998 | Cummins |
| 5,788,311 A * | 8/1998 | Tibbals .................... 296/26.11 |

(List continued on next page.)

*Primary Examiner*—Stephen K. Cronin
(74) *Attorney, Agent, or Firm*—Harness, Dickey & Pierce, P.L.C.

(57) ABSTRACT

A bed extender apparatus for use with a truck bed of a vehicle such as a pickup truck. The bed extender includes a center wall having a pair of uprights at opposite ends thereof. A pair of end walls are pivotably coupled to the uprights and can be folded down over the center wall when the bed extender is not in use, or attached to sidewalls of the truck bed to place the bed extender in a bed extending configuration. The center wall is secured to an inside surface of a tailgate of the vehicle by a pair of mounting assemblies. The mounting assemblies allow the bed extender to be quickly slidably detached from the truck bed when not needed. The bed extender can also be installed within the truck bed to provide an article restraining function.

18 Claims, 19 Drawing Sheets

U.S. PATENT DOCUMENTS

| | | |
|---|---|---|
| 5,806,736 A | 9/1998 | Kincart |
| 5,806,737 A | 9/1998 | Clark |
| 5,806,907 A | 9/1998 | Martinus et al. |
| 5,823,596 A * | 10/1998 | Kulesza .................. 296/26.01 |
| 5,857,724 A | 1/1999 | Jaman |
| 5,997,066 A * | 12/1999 | Scott ....................... 296/26.08 |
| 6,257,637 B1 * | 7/2001 | Reed ....................... 296/26.08 |
| 6,338,515 B1 * | 1/2002 | Munhall .................. 296/26.08 |
| 6,340,190 B1 * | 1/2002 | Rosebrugh et al. ...... 296/26.11 |

* cited by examiner

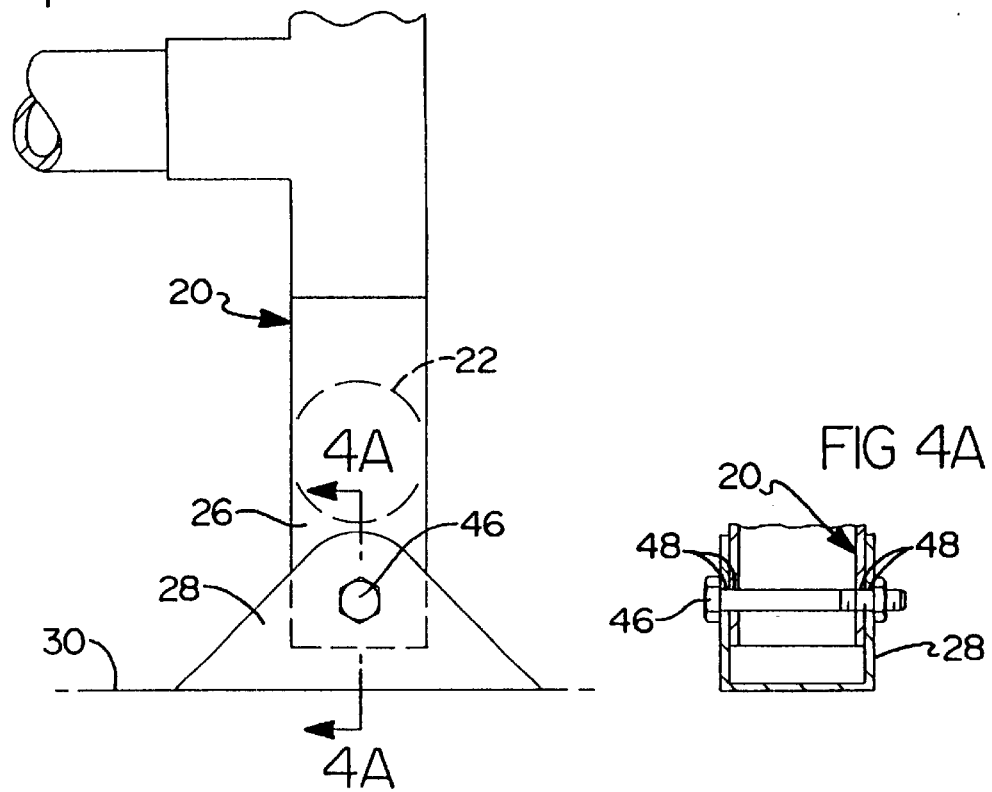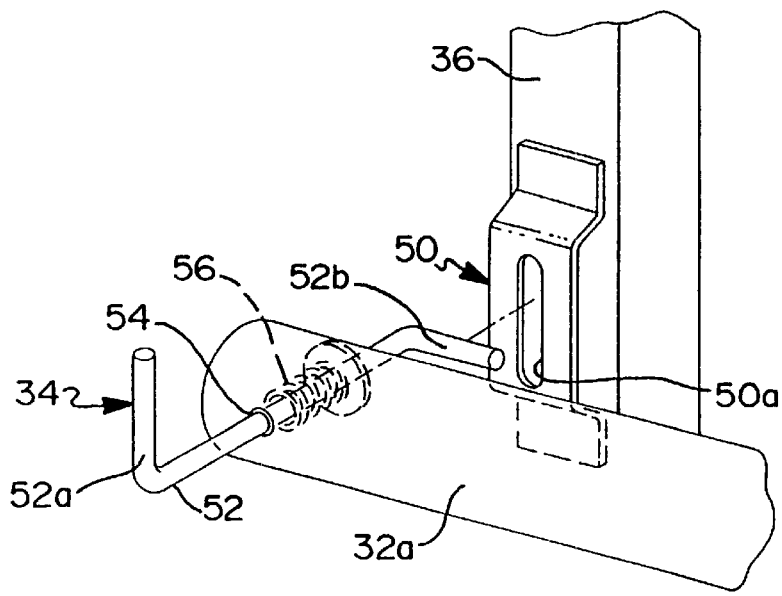

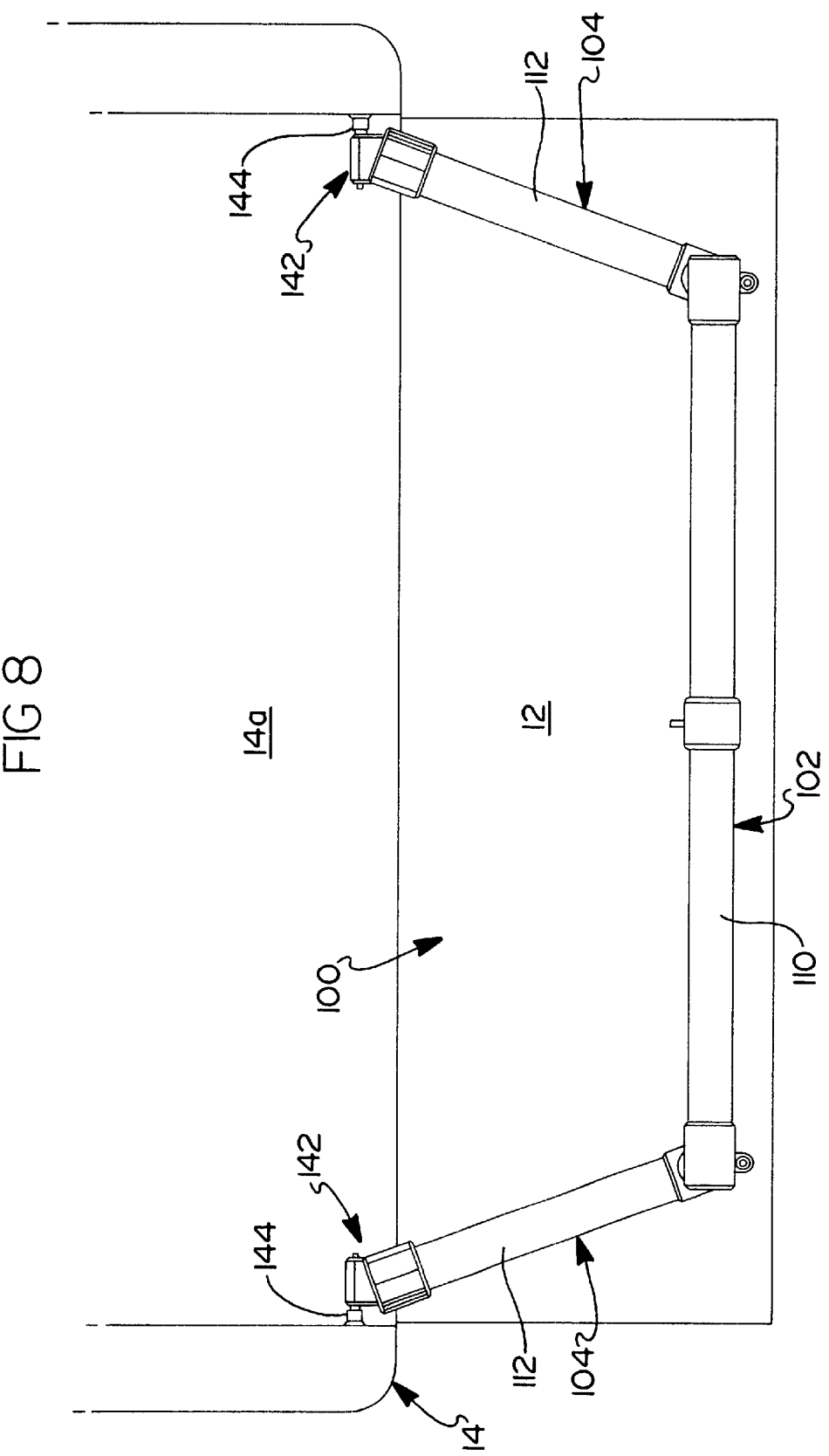

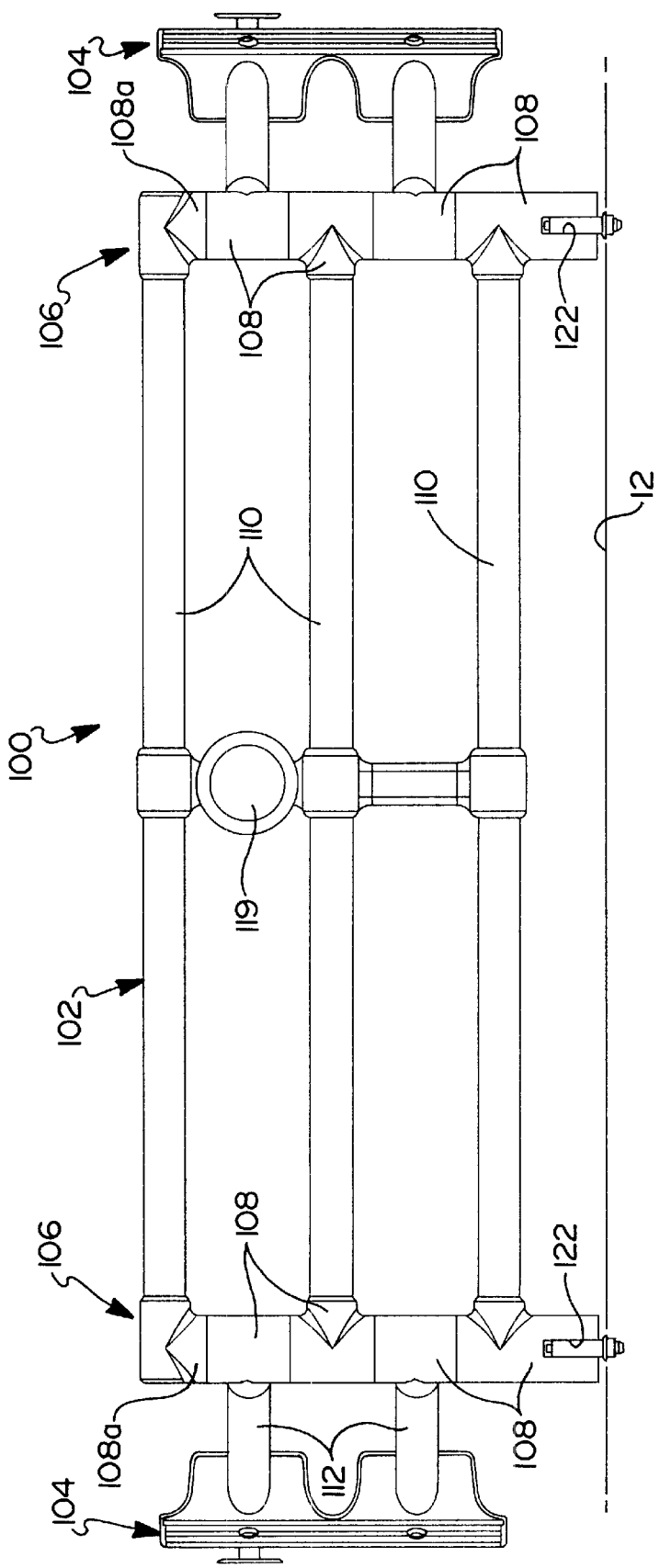

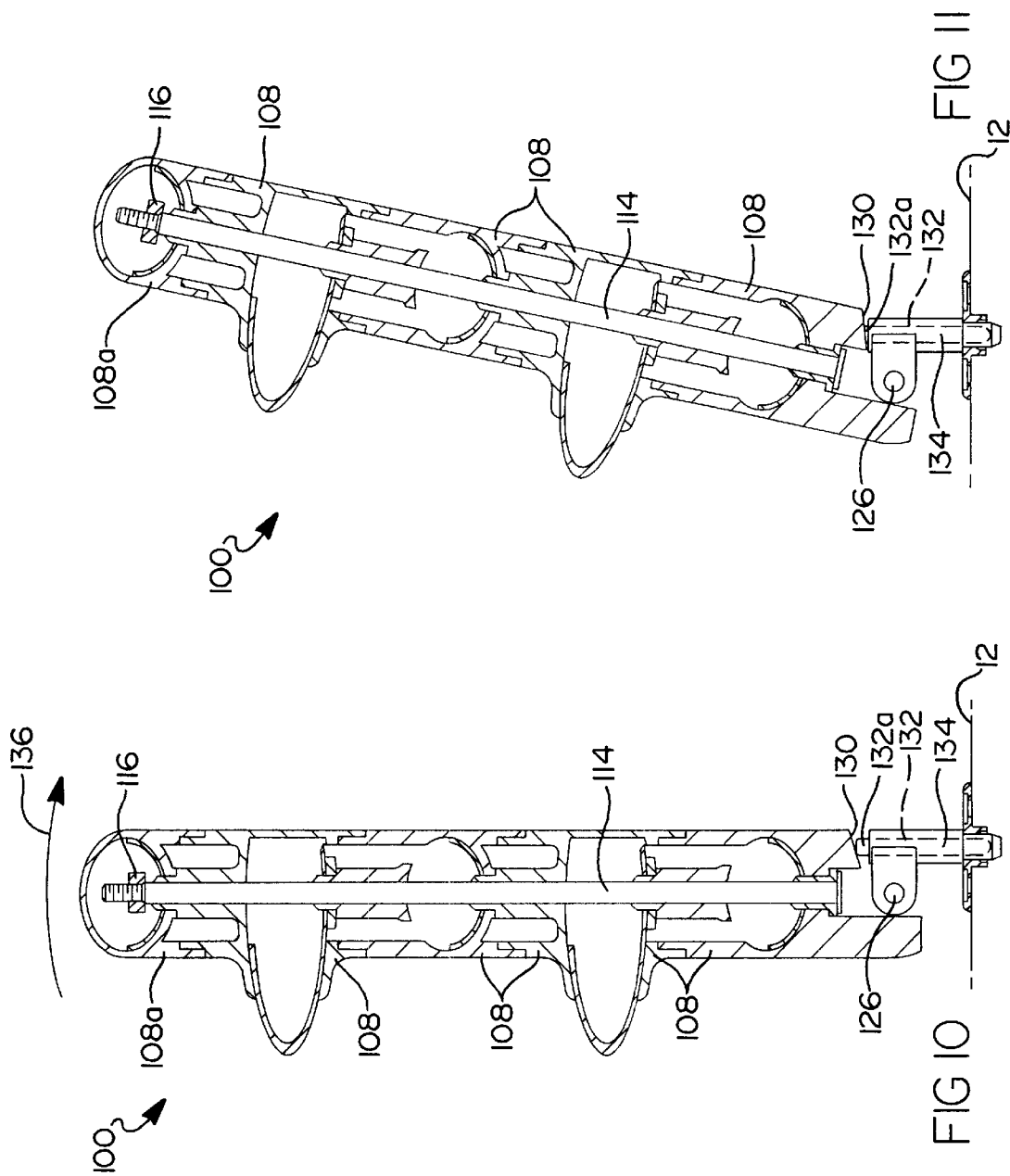

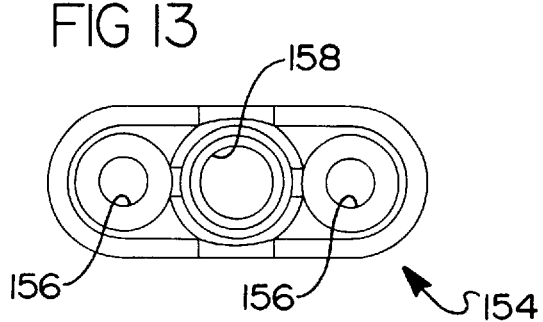
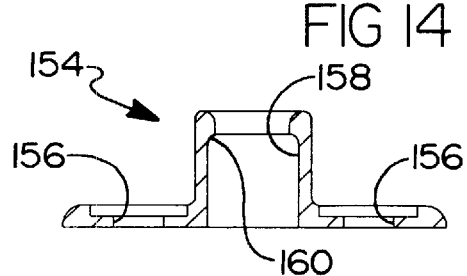
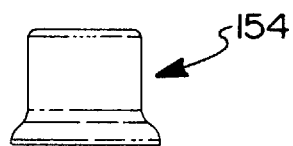
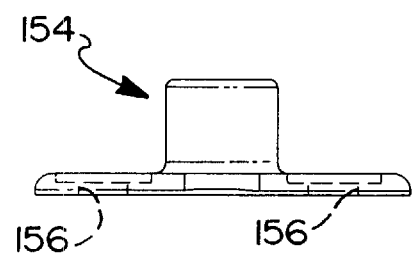

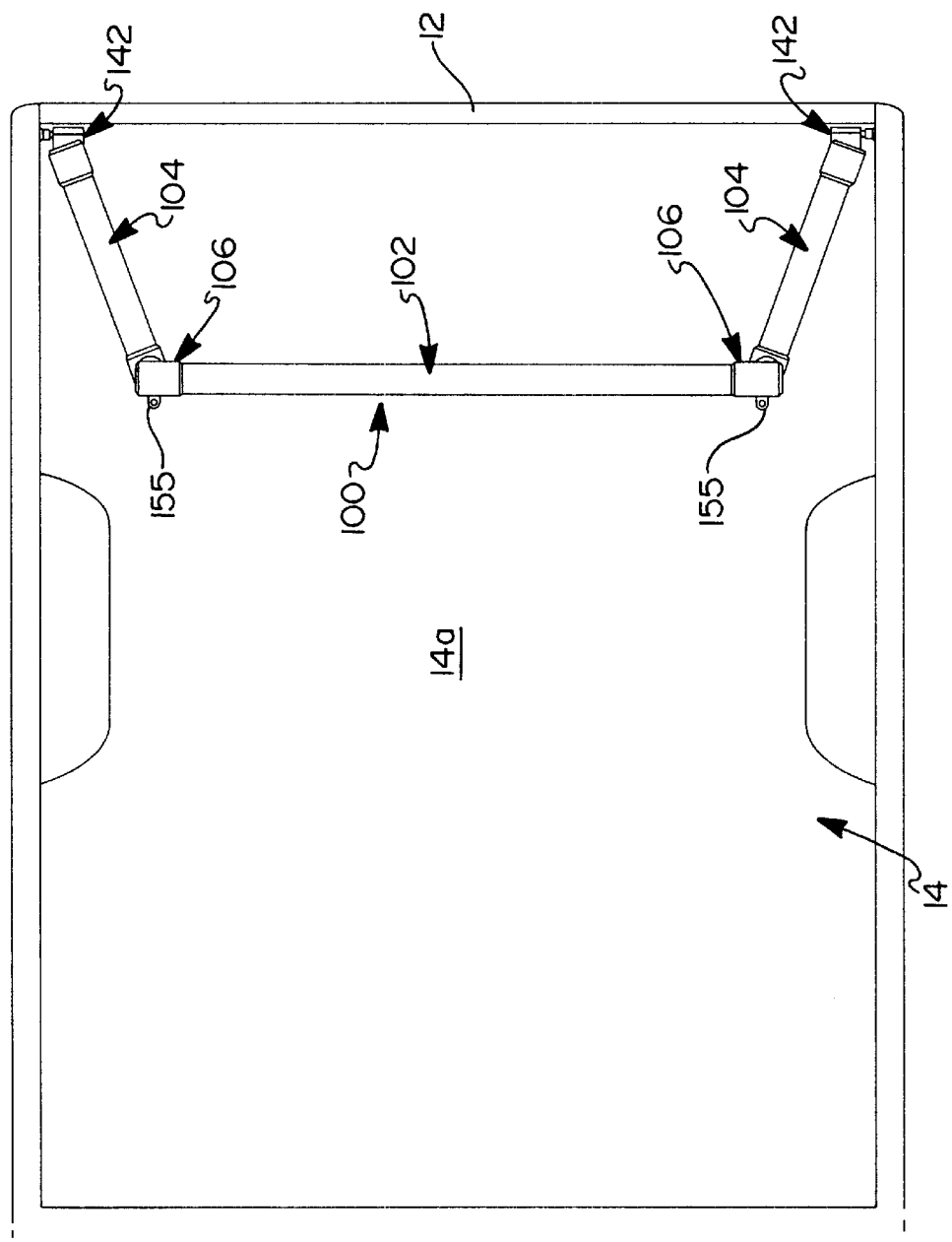

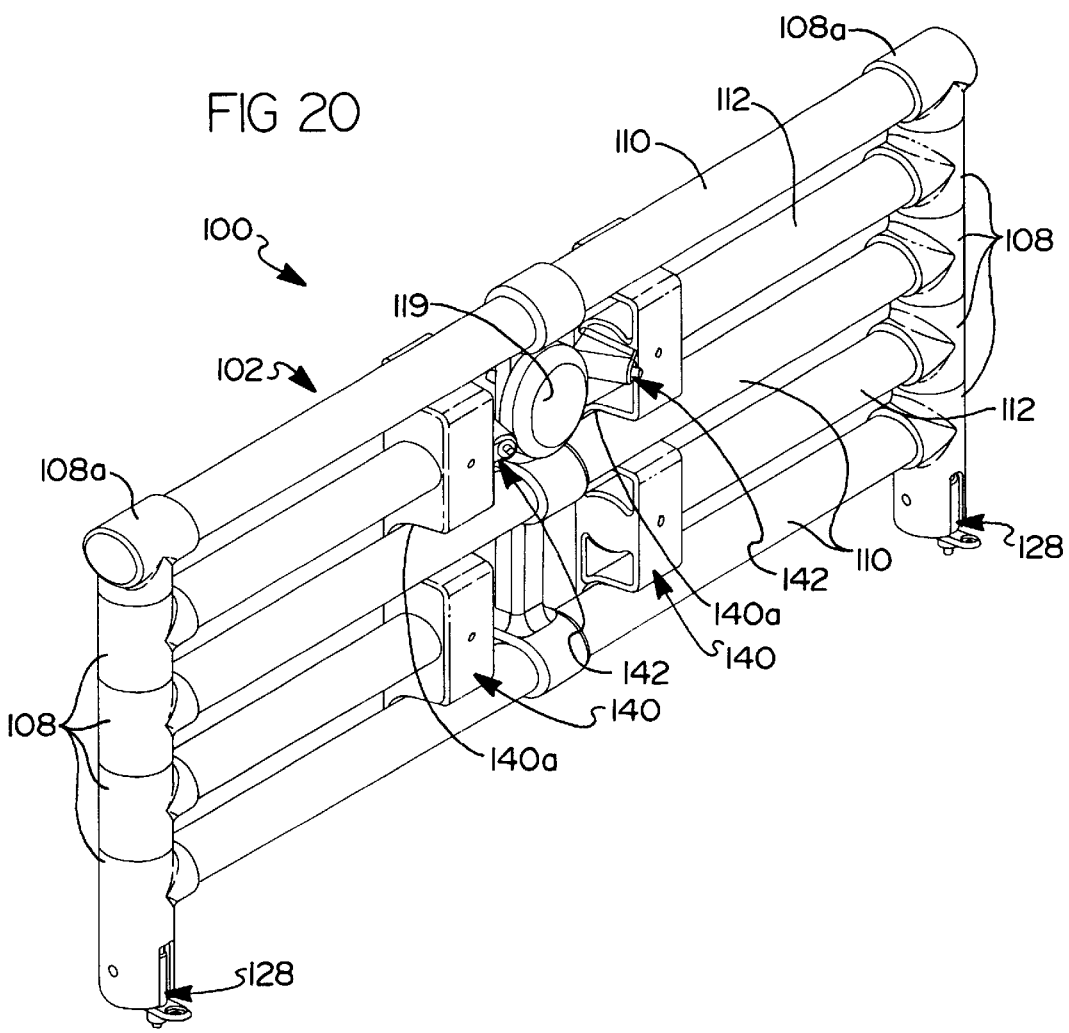
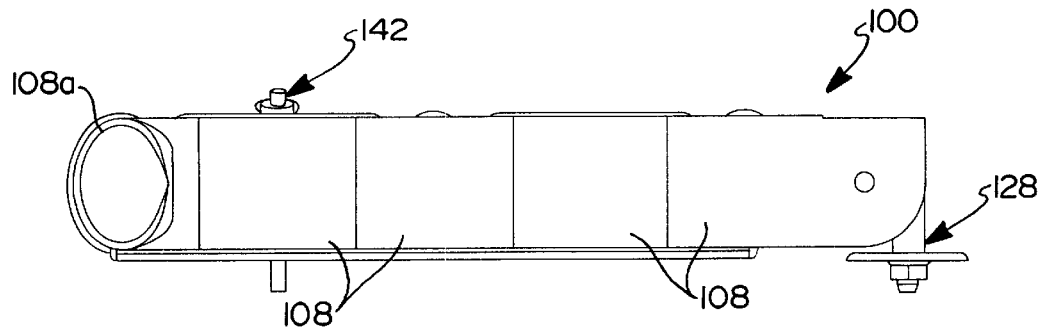

PICKUP TRUCK BED EXTENDER APPARATUS

CROSS REFERENCE TO RELATED APPLICATION

The present application is a continuation-in-part of U.S. Ser. No. 09/702,008, filed Oct. 30, 2000, presently pending, which is a continuation-in-part of U.S. Ser. No. 09/429,613, filed Oct. 29, 1999, now abandoned.

FIELD OF THE INVENTION

This invention relates to devices adapted to be used in connection with a bed of a pickup truck to enhance the cargo carrying capacity of the pickup truck bed, and more particularly to a bed extender apparatus which is adapted to be foldably extended into position to form a three sided upright structure over the tailgate of a pickup truck bed to thereby functionally extend the useable area of the bed when the tailgate is in its lowered position.

BACKGROUND OF THE INVENTION

Various devices have been developed in an attempt to extend the useable space within a bed of a pickup truck. Such attempts are illustrated and described in the following U.S. Pat. Nos.: 797,900; 2,872,239; 4,023,850; 4,136,905; 4,472,639; 4,513,773; 4,778,213; 4,824,158; 4,830,242; 5,154,470; 5,328,225; 5,700,047; 5,775,759.

The devices illustrated and described in the above-referenced patents suffer from a variety of drawbacks. Certain of the devices disclosed are relatively complicated and expensive to construct. Others interfere with placement of cargo in a pickup truck bed area when the device is not in use. Still other ones of the devices disclosed are not capable of being collapsed in an efficient, compact arrangement when the device is not in use.

Another drawback with present day bed extender devices is their inability to be quickly and easily removed from a truck bed when not needed or to be repositioned to perform a restraining function for holding smaller cargo items against movement in the bed while the vehicle is travelling. Thus, it would be desirable to provide a bed extender for a pickup truck which could be used in a first orientation to provide a bed extending function, and also used in a second orientation to provide a cargo restraining function in the truck bed.

It is still a further object of the present invention to provide a bed extender apparatus which can be quickly articulated into its various operative positions without the need for any external tools.

It is still another object of the present invention to provide a bed extender which is relatively inexpensive to produce and which can be secured to a tailgate of a pickup truck with little or no modifications to the tailgate and/or to the pickup truck bed.

It is yet another object of the present invention to provide a bed extender which can be slidingly attached to a tailgate of a pickup truck bed via a pair of quick release mounting assemblies which permit sliding engagement and disengagement of a portion of the bed extender from the tailgate of the vehicle.

SUMMARY OF THE INVENTION

The above and other objects are provided by a bed extender apparatus in accordance with preferred embodiments of the present invention. The bed extender apparatus of the present invention is adapted to be secured to a tailgate of a pickup truck bed and quickly and easily articulated into its operative position after the tailgate is lowered. The bed extender apparatus further does not require any external tools to place it in its operative position or to collapse it from its operative position into a "storage" or fully retracted position.

In one preferred embodiment the bed extender apparatus comprises a center wall having a width substantially in accordance with the width of the tailgate on which it is to be installed. The center wall is formed by a pair of opposing uprights between which extend a plurality of generally linear, elongated members. Each of the uprights are adapted to be pivotably secured to an inner surface of the liftgate at an upper edge of the tailgate such that the entire center wall can be pivoted upwardly once the liftgate is moved into a lowered position.

Extending from each of the uprights is an end wall. Each end wall is formed from a plurality of generally linearly extending members. Each of the members have a first end and a second end. The first ends are operatively coupled to the uprights such that each end wall can be pivoted to a position extending generally perpendicularly from the center wall once the center wall is lifted into its operative position. Each end wall further has a locking mechanism associated therewith. Each locking mechanism is adapted to engage a suitable securing member mounted at or near the rearmost portion of one of the sidewalls of the pickup truck bed.

It is a principal advantage of the present invention that the elongated members of the end walls are staggered and positioned relative to the members of the center wall such that when the end walls are retracted into the stored position they can be positioned in the open areas formed between adjacent ones of the members of the center wall. This allows the end walls to be stored within the plane formed by the members of the center wall but without interference from the center wall members. When in the stored position, the end walls and center wall form a very thin, compact assembly which rests against an inner surface of the tailgate.

When in the operative position, the bed extender apparatus of the present invention forms an extremely strong yet aerodynamically efficient structure which allows the useable space of the pickup truck bed to be effectively enlarged by forming a three-sided wall portion over the tailgate. Another important advantage of the bed extender apparatus is that it does not take up any significant cargo area within the pickup truck bed when it is in its stored position.

In a first alternative preferred embodiment of the present invention a bed extender is disclosed which can be quickly and easily removed from a tailgate to which it is attached and reattached so as to form a cargo restraining area within the bed of a pickup truck. With this embodiment a first pair of mounting elements are fixedly disposed within the tailgate. A second pair of mounting elements are fixedly disposed at upper areas of the sidewalls of the truck bed adjacent the tailgate. A third pair of mounting elements are fixedly disposed in the bed forwardly of the first pair.

The bed extender is similar to the previous embodiments discussed in that a pair of uprights are formed by a plurality of T-shaped fittings secured together by rods which extend substantially the entire length of each upright. The T-shaped fittings are secured alternately to main supports which extend between the two uprights to form a center wall, and also to a plurality of end wall support members which form two separate end walls. The main supports are spaced apart parallel to one another to form a plurality of open areas therebetween. Similarly, the end wall support members are spaced apart to form open areas therebetween. The end wall support members can be pivoted down to rest inbetween, and flush with, the main supports to form a low profile, planar assembly when not in use.

A principal advantage with the alternative preferred embodiment described above is the inclusion of quick release mounting assemblies incorporated at the bottom of each upright and a pair of quick release latching pins associated with the end walls. The quick release mounting assemblies engage with the first pair of mounting elements to maintain the center wall securely attached to the tailgate. Since the mounting assemblies and mounting pins can be quickly and easily manually released, the entire bed extender can be removed from the tailgate. The bed extender can then be rotated 180 degrees and the quick release mounting assemblies secured to the third pair of mounting elements. This positions the center wall within the area of the truck bed. The locking mechanisms of the end walls can then be secured to the second pair of mounting elements disposed on the sidewalls of the truck bed. When the tailgate is in a raised position, the bed extender thus forms a cargo restraining device for holding smaller articles in the bed against movement.

In a second alternative preferred embodiment a bed extender is provided which can be slidingly attached and detached from a tailgate of a pickup truck. This embodiment also incorporates a center wall and a pair of end walls. The center wall is formed by a plurality of spaced apart main supports and the end walls are each formed by a plurality of spaced apart end wall support members. The outermost ends of each of the main supports are pivotally secured to a pair of uprights, as are the outermost ends of each of the end wall support members. Thus, the end walls can be folded into the spaces between the main supports when the bed extender is not in use to form a compact, planar assembly that rests against an inside surface of the tailgate.

The second alternative preferred embodiment described above makes use of a pair of quick release mounting assemblies that allow the bed extender to be slidingly removed from the tailgate. One quick release mounting assembly is associated with each upright. Each quick release mounting assembly includes a first element secured to a lower end of its associated upright and a second element fixedly secured to a surface of the tailgate. Each of the first and second elements includes a channel which engages with its mating element when the first element is slidingly urged over the second element. Thus, once the first elements of the mounting assemblies are slidingly urged over their respective second elements, the mounting assemblies hold the uprights, and thus the center and end walls, secured to the tailgate.

The second preferred embodiment also includes a pair of end posts which incorporate cooperative, key-shaped locking components which allow the end walls to be quickly and easily secured to inside surfaces of the sidewalls of the pickup truck bed without external tools.

BRIEF DESCRIPTION OF THE DRAWINGS

The various advantages of the present invention will become apparent to one skilled in the art by reading the following specification and subjoined claims and by referencing the following drawings in which:

FIG. 4 is a side, fragmentary view of a portion of the center wall pivotably secured via a mounting bracket to an inner surface of the tailgate;

FIG. 4a is a cross sectional view taken in accordance with section line 4a—4a in FIG. 4 of the bracket member which secures an associated upright for pivotable movement; and FIG. 5 is a fragmentary, perspective view of a portion of the end wall illustrating more clearly the locking mechanism which secures the end wall to the vertical wall of the pickup truck bed.

FIG. 8 is a top view of the bed extender of FIG. 7;

FIG. 9 is a rear view of the bed extender of FIG. 7;

FIG. 10 is a partial cross-sectional side view of the bed extender showing the center wall in its fully raised position;

FIG. 11 is a view of the center wall shown in FIG. 10 after having been tilted rearwardly to unlock the locking pin from its mounting element;

FIGS. 13–16 are views of the mounting element;

FIG. 17 is a plan view of the truck bed with the bed extender mounted to pen rearwardly, thus forming a cargo restraining implement;

FIG. 20 is a perspective view of the bed extender in its folded position;

FIG. 21 is a side view of the bed extender in its folded position; and

FIG. 31 is a partial perspective view of one end of the bed extender with one of the end posts thereof about to be secured to a mounting rail, wherein the mounting rail is shown spaced apart from a sidewall of the truck bed;

DETAILED DESCRIPTION OF THE PREFERRED EMBODIMENTS

Figure 1:
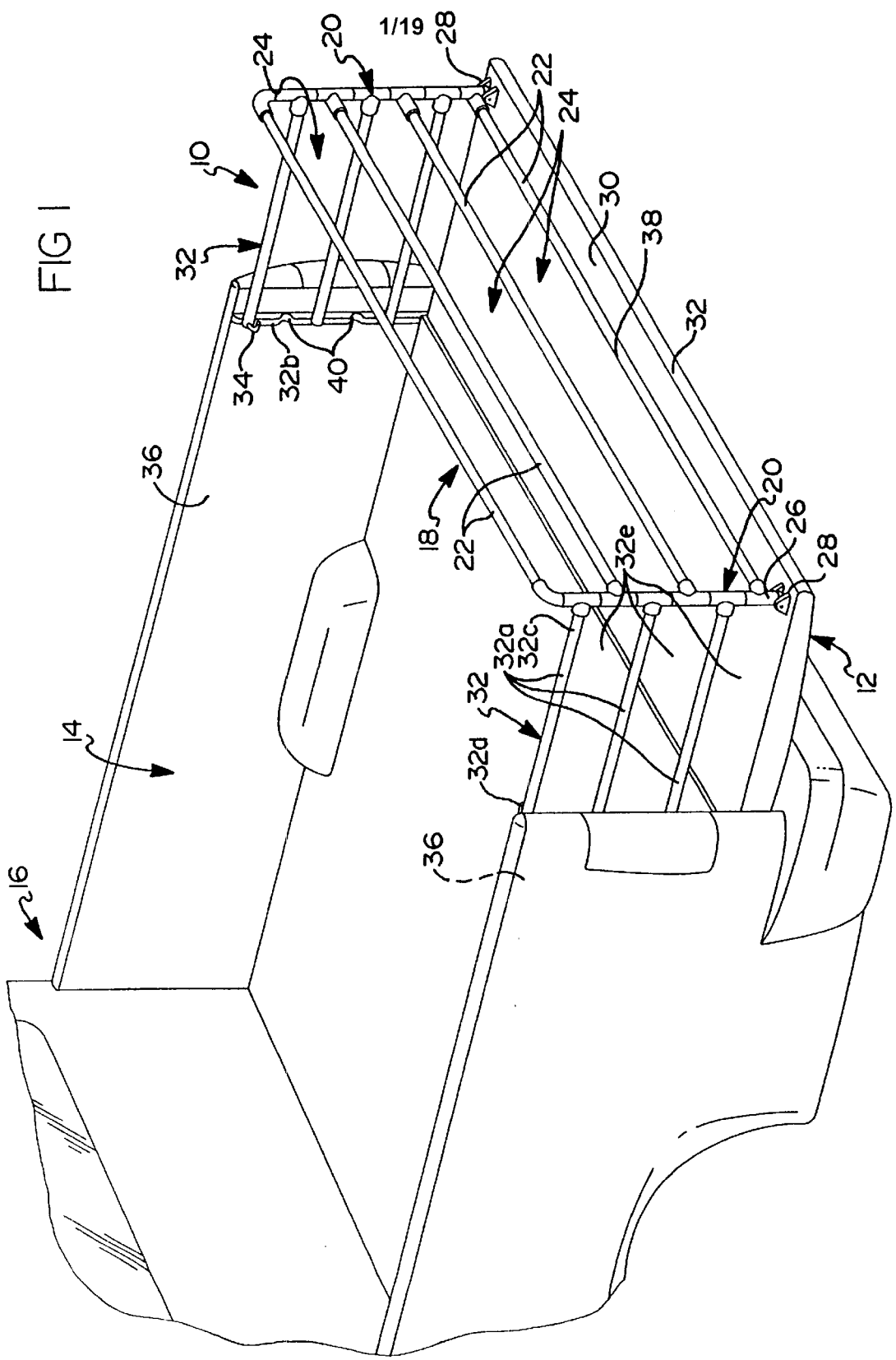
FIG. 1 is a perspective view of a bed extender apparatus in accordance with a preferred embodiment of the present invention secured to a pickup truck bed, showing the apparatus in its operative position.

Referring to FIG. 1, there is shown a pickup truck bed extender 10 in accordance with a preferred embodiment of the present invention. The bed extender 10 is shown secured to a tailgate 12 of a pickup truck bed 14 of a vehicle 16. The bed extender 10 generally comprises a center wall 18 and a pair of end walls 32. The center wall 18 has a pair of uprights 20 and a plurality of linear, elongated members 22 extending between the uprights 20. The members 22 are spaced apart so as to provide open areas 24 between adjacent ones of the members 22. Each upright 20 is secured at a first end 26 by a bracket member 28 which is fixedly secured to an inner surface 30 of the tailgate 12 near an upper edge 31 of the tailgate 12. The brackets 28 allow the uprights 20 to be pivoted between the position shown in FIG. 1 (i.e., the operative position) and the stored or retracted position shown in FIG. 2.

Pivotably secured to each upright 20 is one of the end walls 32. Each end wall 32 is formed by a plurality of elongated members 32a which are secured to a common end post 32b. The members 32a extend generally parallel to one another to form open areas 32e therebetween. The end wall 32 is secured at a first end 32c to an associated one of the uprights 20. A second end 32d thereof is secured via a locking mechanism 34 to an associated vertical sidewall 36 of the pickup truck bed 14. When in the operative position shown in FIG. 1, the bed extender 10 forms a strong yet very aerodynamically efficient means for functionally extending the useable interior area of the truck bed 14. The open areas 24 and 32e allow air to flow easily through the bed extender 10 thus significantly reducing the wind drag which would typically be produced by other forms of bed extenders.

With further reference to FIG. 1, one or more support blocks 38 may also be fixedly secured to the inner surface 30 of the liftgate 12 to help support the center wall 18 when the bed extender 10 is in its stored position. To assist in accomplishing this, each support block 38 preferably includes a plurality of recesses or cutouts 40 formed so as to receive portions of the support members 22 of the center wall 18 when the center wall is folded into its stored position. Preferably, metal interfering clips could be provided in the recesses 40 to releasably latch onto their associated members 22 when the center wall is folded down into its stored position.

Figure 2:
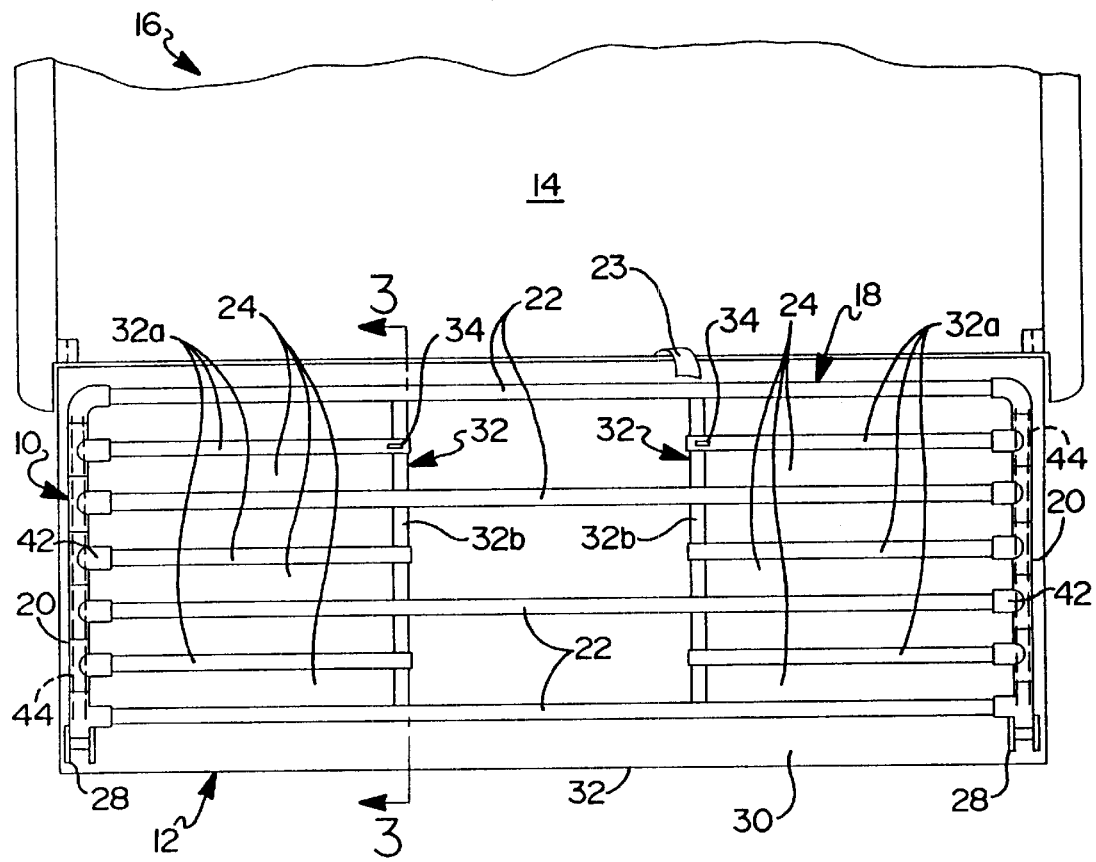
FIG. 2 is a plan view of the bed extender apparatus of FIG. 1.
Figure 3:
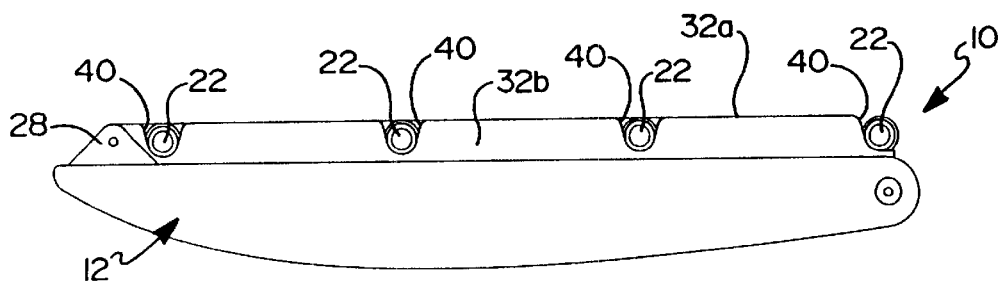
FIG. 3 is a cross sectional end view in accordance with section line 3—3 in FIG. 2 illustrating how compactly the members of each of the center wall and the end walls reside within a generally common plane when the bed extender is in its stored position.

Referring now to FIG. 2, the bed extender 10 is illustrated in its stored position. The members 32a of the end walls 32 fit within the open areas 24 between adjacent ones of the members 22. As such, the members 32a rest within the same plane as the members 22, as can be even better seen in FIG. 3. The members 22 rest in the recesses 40 of the support blocks 38 to help prevent vibration or rattling when the vehicle 16 is travelling over rough surfaces.

Each of the members 32a of the end walls 32 preferably are secured by T-shaped fittings 42 to a frame member 44 which extends through each of the fittings 42. Similarly, each member 22 is secured by identical T-shaped fittings 42 to the frame member 44. It will be appreciated, however, that any means which allows the members 32a to be pivoted relative to the center wall 18 may be used to couple the members 32a to the uprights 20. The members 32a and 22 may comprise lightweight, tubular metal components such as tubular aluminum or steel lengths which are lightweight and yet structurally strong.

Referring now to FIGS. 1 and 4 and 4a, a portion of one of the uprights 20 can be seen with the bracket member 28 shown in enlarged fashion coupling the upright 20 to the inner surface 30 of the tailgate 12. The bracket member 28 preferably forms a U-shaped component having a threaded bolt 46 or other like member which extends through openings 48 to pivotably secure the first end 26 of the upright 20 thereto. It will be appreciated, however, that a variety of differently shaped brackets could be employed, the only requirement being that the bracket allow easy pivoting movement of the upright 20 between its operative and stored positions. The bracket member 28 is preferably formed from metal or another suitably high strength material.

Referring now to FIG. 5, the locking mechanism 34 and an associated securing member 50 can be seen in greater detail. The locking mechanism 34 preferably comprises a curved locking member 52 which extends through an opening 54 in an end of one of the members 32a. The locking member 52 preferably includes two L-shaped ends, a portion 52a being adapted to be manually grasped by an individual, and portion 52b adapted to engage within an opening 50a of the securing member 50. A spring 56 is operably associated with the locking member 52 so as to bias portion 52a away from the member 32a once portion 52b is inserted within the opening 50a and rotated approximately 90° into the position shown in FIG. 5. Securing member 50 is preferably fixedly attached to the vertical sidewall portion 36 of the truck bed 14. Thus, to lock the end wall 32 associated with locking mechanism 34, the user pushes against portion 52a which causes portion 52b to enter the opening 50a and, while maintaining this pushing force, rotates portion 52a either clockwise or counterclockwise 90° before releasing the locking member 52.

Figure 6:
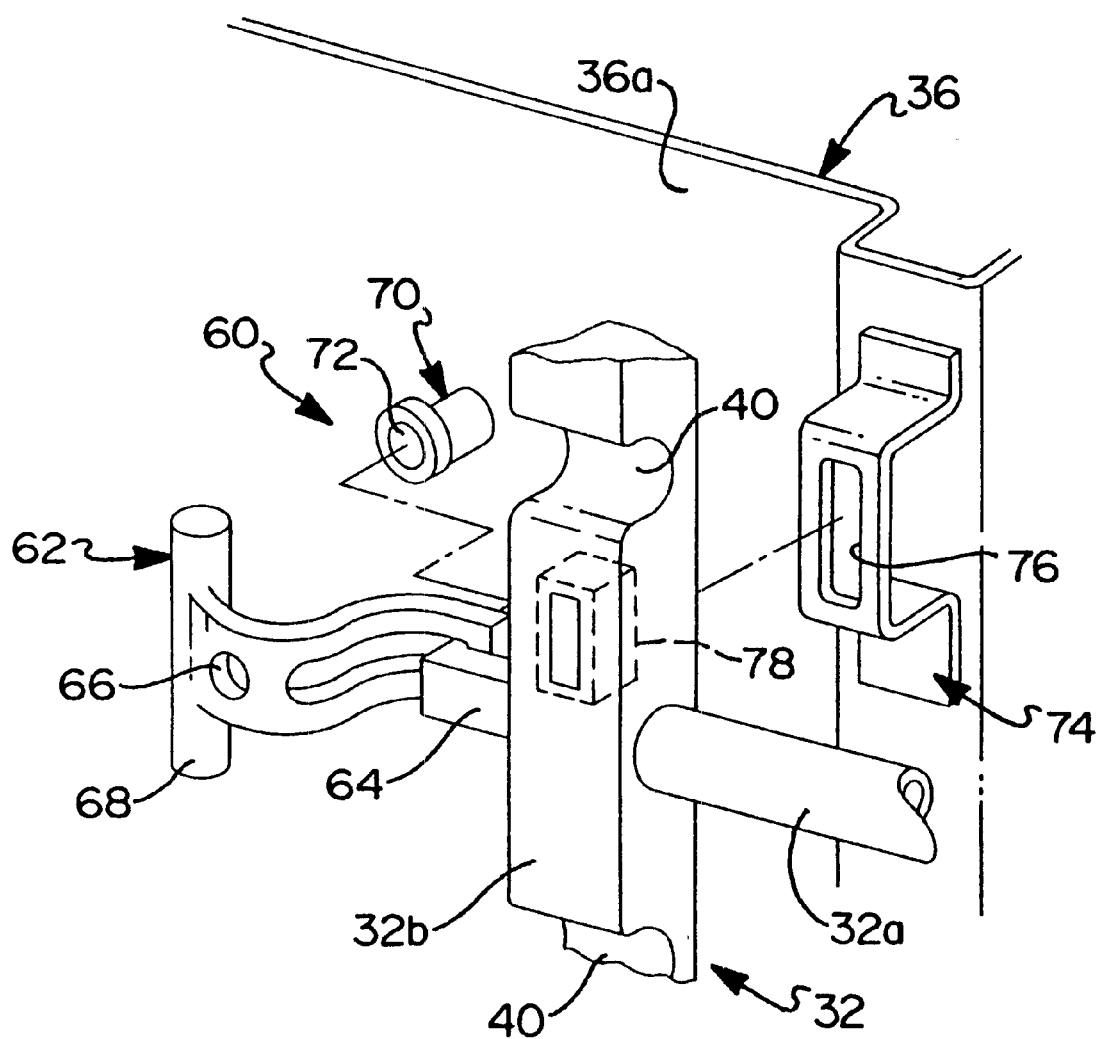
FIG. 6 is a perspective view of a portion of a locking mechanism in accordance with an alternative preferred embodiment of the present invention.

Referring to FIG. 6, an alternative preferred embodiment 60 of the locking mechanism 34 will be described. The locking mechanism 60, which is the more preferred locking arrangement at the present time, includes an elastic strap 62 which is captively secured by a U-shaped member 64 fastened to the end post 32b, such as by threaded screws (not shown). The strap 62 includes an opening 66 and a handle portion 68. The handle portion 68 can be grasped to stretch the strap 62. A securing post 70 is fixedly secured by a threaded screw 72 to the inside surface 36a of the vertical wall 36 of the truck bed 14. A U-shaped bracket 74 having an opening 76 is also fixedly secured to the inside surface 36a of the wall 36 of the truck bed 14.

The end post 32b is preferably molded from a suitably high strength plastic and includes a projecting portion 78. The end post 32b may further include a recessed area (not shown) immediately surrounding the projection portion 78.

The end wall 32 is secured to the bracket 74 by positioning the end post 32b such that the projecting portion 78 fits within the opening 76 in the bracket 74. The user than grasps the strap 62 by handle portion 68 pulls outwardly while urging the strap over the securing post 70. In this manner the end post 32b is held securely to the bracket 74.

To articulate the apparatus 10 from the position shown in FIG. 2 into the position shown in FIG. 1, the user first lifts the center wall 18 upwardly until it is approximately perpendicular to the upper surface 30 of the tailgate 12. The user then folds out each of the end walls 32 into the position shown in FIG. 1. The locking mechanism 34 associated with each end wall 32 can then be secured to its associated securing member 50. Collapsing of the bed extender 10 is performed in the opposite order just given.

The bed extender apparatus 10 thus forms a relatively low cost, easy to install and use apparatus for functionally enlarging the useable cargo area of a pickup truck bed. Importantly, when not in use, the bed extender 10 of the present invention forms an extremely compact assembly which does not take up any appreciable cargo area within a pickup truck bed. The apparatus is easy to construct, strong and yet light in weight and is extremely aerodynamically efficient when in use. The bed extender 10 forms an extremely slim, compact arrangement when not in use.

Figure 7:
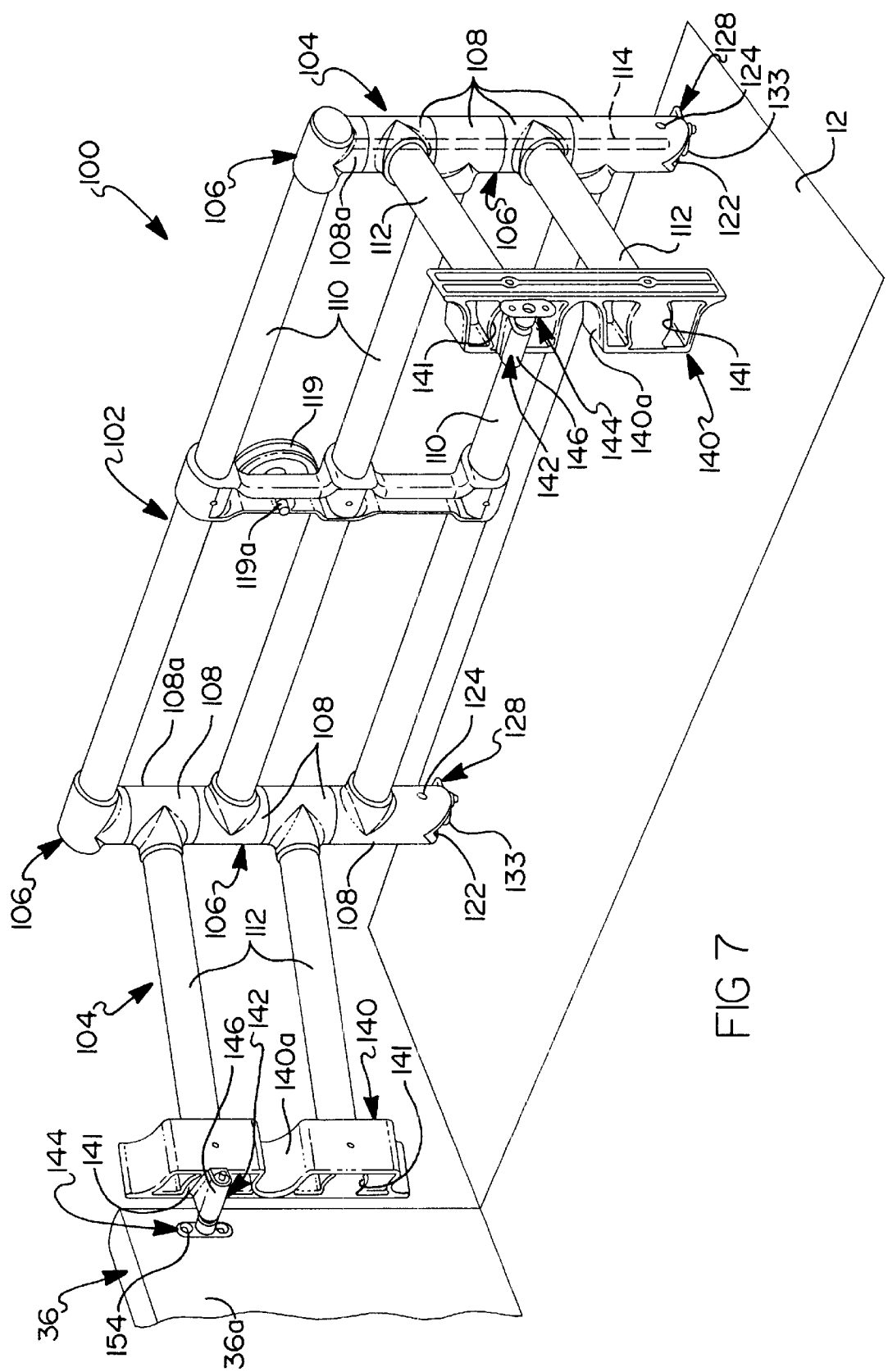
FIG. 7 is a perspective view of a bed extender in accordance with an alternative preferred embodiment of the present invention.

Referring now to FIGS. 7–9, a bed extender 100 is illustrated in accordance with an alternative preferred embodiment of the present invention. The bed extender 100 is similar to the bed extender 10 in that it includes a center wall 102 and a pair of end walls 104. The center wall 102 includes a pair of uprights 106 at its outermost ends which are formed by a plurality of tubular, T-shaped fittings 108 and 108a. Alternating ones of the fittings 108 are coupled to main supports 110 and to end wall support members 112. The main supports 110 and end wall support members 112 are each preferably formed by tubular lengths of strong yet lightweight material, such as aluminum, or any other suitably strong and lightweight material. As shown in FIG. 10, a rod 114 runs through each of the T-shaped fittings 108 and is threadably secured to a terminal fastening element 116.

The center wall 102 includes a manually graspable hold down element 119 having a threaded shaft 119a that can be engaged with a rivnut (not shown) disposed in the tailgate 12 when the center wall is in its folded orientation. Turning the hold down element 119 allows the user to quickly lock the center wall 102 in a folded position.

Figure 18:
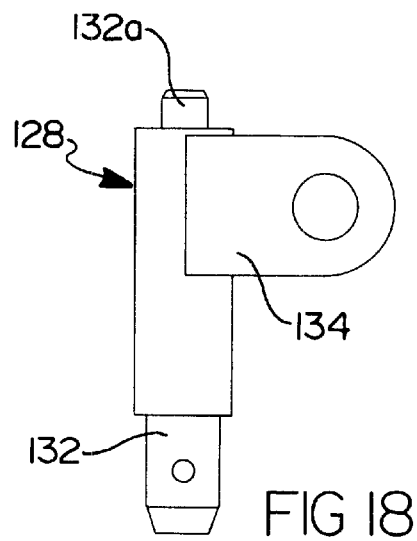
FIG. 18 is a side view of the quick release mounting assembly secured to each of the uprights.

A lower end of each upright 106 includes a slot 122 and a through aperture 124. A pivot pin 126 is used to secure the lower end to a quick release mounting assembly 128, shown in FIG. 18, which is in turn fixedly secured to the tailgate 12 of the vehicle 16. A camming surface 130, as best shown in FIGS. 10 and 11, makes contact with a spring biased latching pin 132 captively retained in a housing 134 (FIG. 18) of the mounting assembly 128 when the center wall 102 is pivoted in the direction of arrow 136. This pivoting motion depresses a plunger 132a of the latching pin 132 which allows the latching pin 132 to be disengaged from one of a first pair of mounting elements 133 fixedly secured to the inside surface 30 of the tailgate 12. One of the mounting elements 133 is shown in FIGS. 22–25 and includes a central opening 133a for receiving the latching pin 132 and a pair of holes 133b for allowing conventional fastening elements to be used to secure the mounting element 133 to the tailgate 12. A shoulder portion 133c engages a portion of the latching pin 132 to maintain the latching pin 132 secured thereto.

Referring further to FIGS. 7–9, the end walls 104 also each include an end post 140. Each end post 140 is secured to an outermost end of one of the end wall support members 112, and each includes a plurality of recesses 141 for accepting the outermost end portions of the support members 112. Pins, threaded screws or even adhesives can be used to secure the outermost ends of the support members 112 within their respective recesses 141.

Each end post 140 further includes a locking mechanism 142 for securing its associated end wall 104 to one of a pair of second mounting elements 154, which are in turn secured to an inside surface 36a of the sidewall 36 of the bed 14. The locking mechanism 142 includes a housing 146 which has a captively held, spring biased latching pin 148, also shown in FIG. 12, secured thereto. The locking mechanisms 142 allow the end walls 104 to be quickly and easily secured to the sidewalls 36.

Referring now to FIGS. 13–16, one of the second pair of mounting elements 154 is illustrated. The mounting element 154 is secured to a frame member disposed within the tailgate 12 by a pair of conventional fastening elements which extend through openings 156. Central opening 158 has an internal shoulder portion 160 (FIG. 14) which engages the latching pin 132 to maintain it secured thereto.

Figure 12:
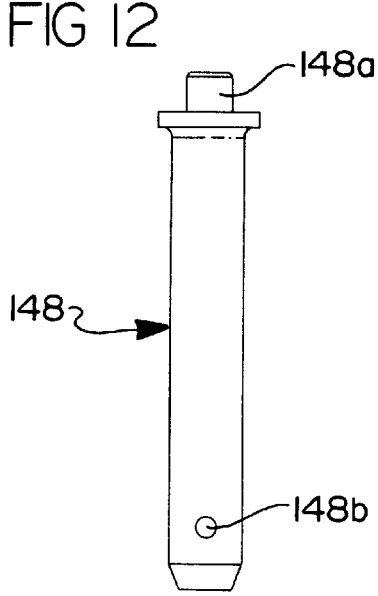
FIG. 12 is a side view of the locking pin used with the bed extender of the present invention.

Latching pins 132 and 148 are identical in construction, and thus only one will be described. Referring to FIG. 12, latching pin 148 is known in the industry as a "positive lock pin". This component is commercially available from Pivot Point, Inc. of Hustisford, Wis. The plunger 148a of latching pin 148 includes ball bearings 148b spring biased by an internally mounted spring (not shown). The ball bearings 148b engage with the internal shoulder 160 of the mounting element 164 (shown in FIG. 14) to maintain the uprights 106 secured to the mounting elements 154. Pushing on the plunger 132a allows ball bearings 148b to be retracted so that the latching pin 148 can be removed from the mounting element 154. With the support columns 106 and locking mechanisms 142 unlatched from their respective securing structures the assembly comprising the center wall 102 and end walls 104 can be removed.

A principal advantage of the bed extender 100 is that once detached, it can be rotated 180 degrees and reattached so as to open rearwardly. This is shown in simplified form in the plan view of FIG. 17. The quick release mounting assembly of each upright 106 is attached to a respective one of a third pair of mounting elements 155 mounted within a floor 14a of the bed 14. Mounting elements 155 are spaced apart such that the uprights 106 can be directly secured thereto. Mounting elements 155 are identical in construction to mounting elements 154. The locking mechanisms 142 are secured to their respective mounting elements 154 to hold the end walls 104 to the vehicle's sidewalls 36.

When positioned to open rearwardly as shown in FIG. 17, the bed extender 100 can function as a cargo restraining device to restrain small and medium sized items of cargo therewith. The tailgate 12 is positioned in its closed position and thus forms one wall which cooperates with the bed extender 100 in defining the area within which cargo can be placed. In this orientation, the bed extender 100 prevents small and medium sized cargo items from moving around within the bed 14 when the vehicle 16 is in motion.

Figure 19:
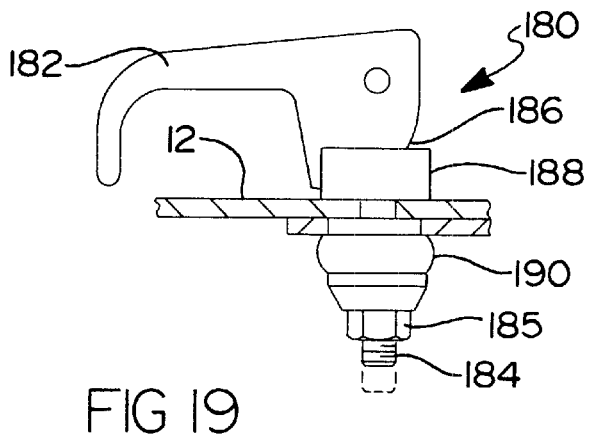
FIG. 19 is a side view of a quick release clamping assembly used to secure the bed extender in a folded position.
Figure 22:
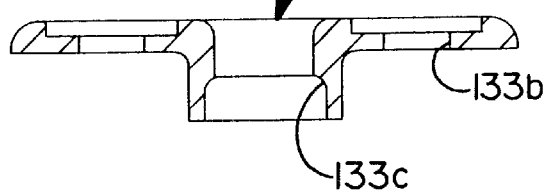
FIGS. 22–25 illustrate the first mounting element.
Figure 23:
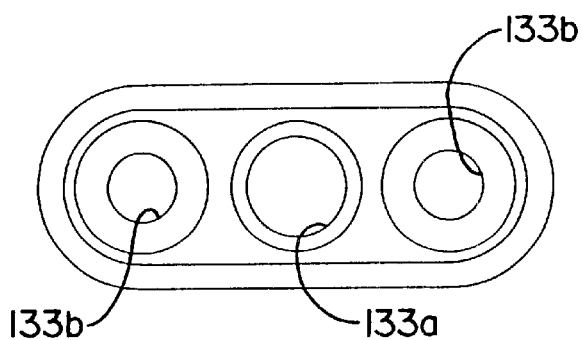
Figure 24:
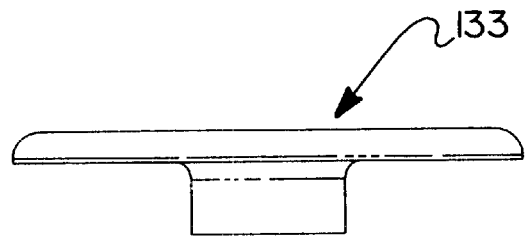
Figure 25:
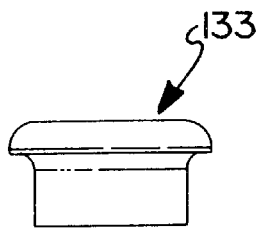

With either of the embodiments 10 or 100 of the bed extender, a quick release clamping assembly 180, shown in FIG. 19, can be incorporated with the center wall 18 or 102 to clamp the center wall to an inside surface 12a of the tailgate 12 when the bed extender 100 is in its folded orientation. This clamping assembly 180 is commercially available from Southco, Inc. of Concordville, Pa. The clamping assembly includes a lever 182 which is pivotally attached to a threaded shaft 184. The lever includes a camming surface 186. A washer 188 and a bushing 190 are both disposed over the shaft 184. A nut 185 secures the washer 188 and bushing 190 to the shaft 184.

The clamping assembly 180 is secured to a central area of the center wall 102. A hole is formed on an inside surface of the tailgate 12 at the point of contact of the shaft 184 when the center wall 102 is folded down onto the tailgate 12. The bushing 190 extends down into the hole. When the lever 182 is urged into the position shown in FIG. 19, the bushing 190 is compressed, causing it to bulge outward. The bulging portion is disposed within the hole, which maintains the assembly 180 secured to the tailgate 12.

The bed extender 100 is shown in its folded orientation in FIGS. 20 and 21. Recesses 140a in the end posts 140 allow them to be folded down over the middle support 110. In this manner the bed extender 100 forms a very compact assembly that does not interfere with the area of the bed 14a when not in use.

Figure 26:
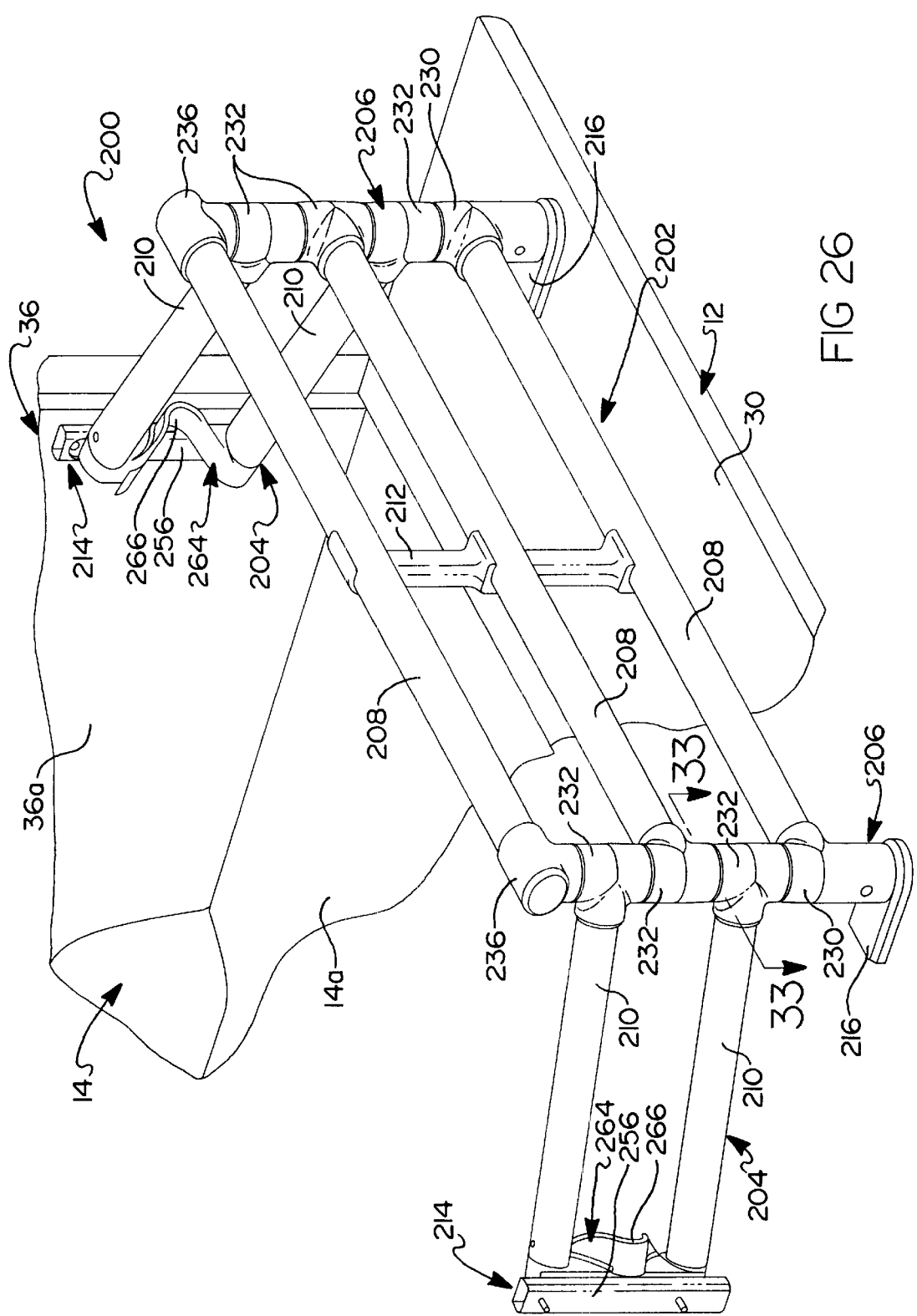
FIG. 26 is a perspective view of a bed extender in accordance with a second alternative preferred embodiment of the present invention showing the bed extender secured to the tailgate and sidewalls of a pickup truck bed.
Figure 35:
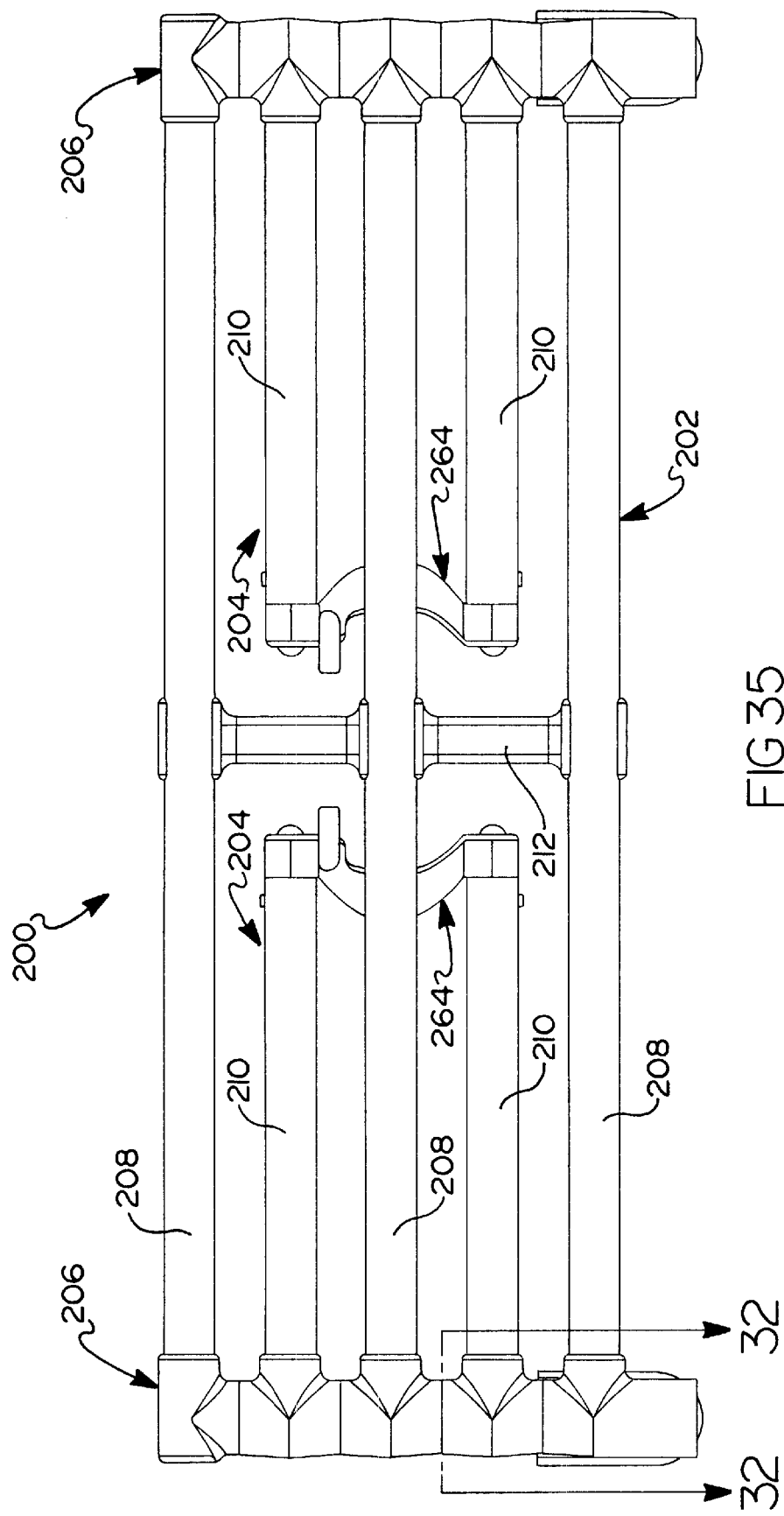
FIG. 35 is a plan view of the bed extender in its folded position taken form the rear of the vehicle, and with the tailgate omitted for illustration purposes.

Referring now to FIG. 26, a bed extender 200 in accordance with a second alternative preferred embodiment of the present invention is shown. The bed extender 200 includes a center wall 202 and a pair of end walls 204. A pair of uprights 206 are used to intercouple a plurality of spaced apart main supports 208 of the center wall 202 with end wall support members 210 of each of the end walls 204. The end walls 204 operate similar to the previously described embodiments in that they can be folded down such that the end wall support members 210 rest within the open areas inbetween each of the main supports 208, as shown in FIG. 35. In a collapsed position, the bed extender 200 forms a compact, planar assembly which can be folded down to rest against the inner surface 30 of the tailgate 12.

Figure 28:
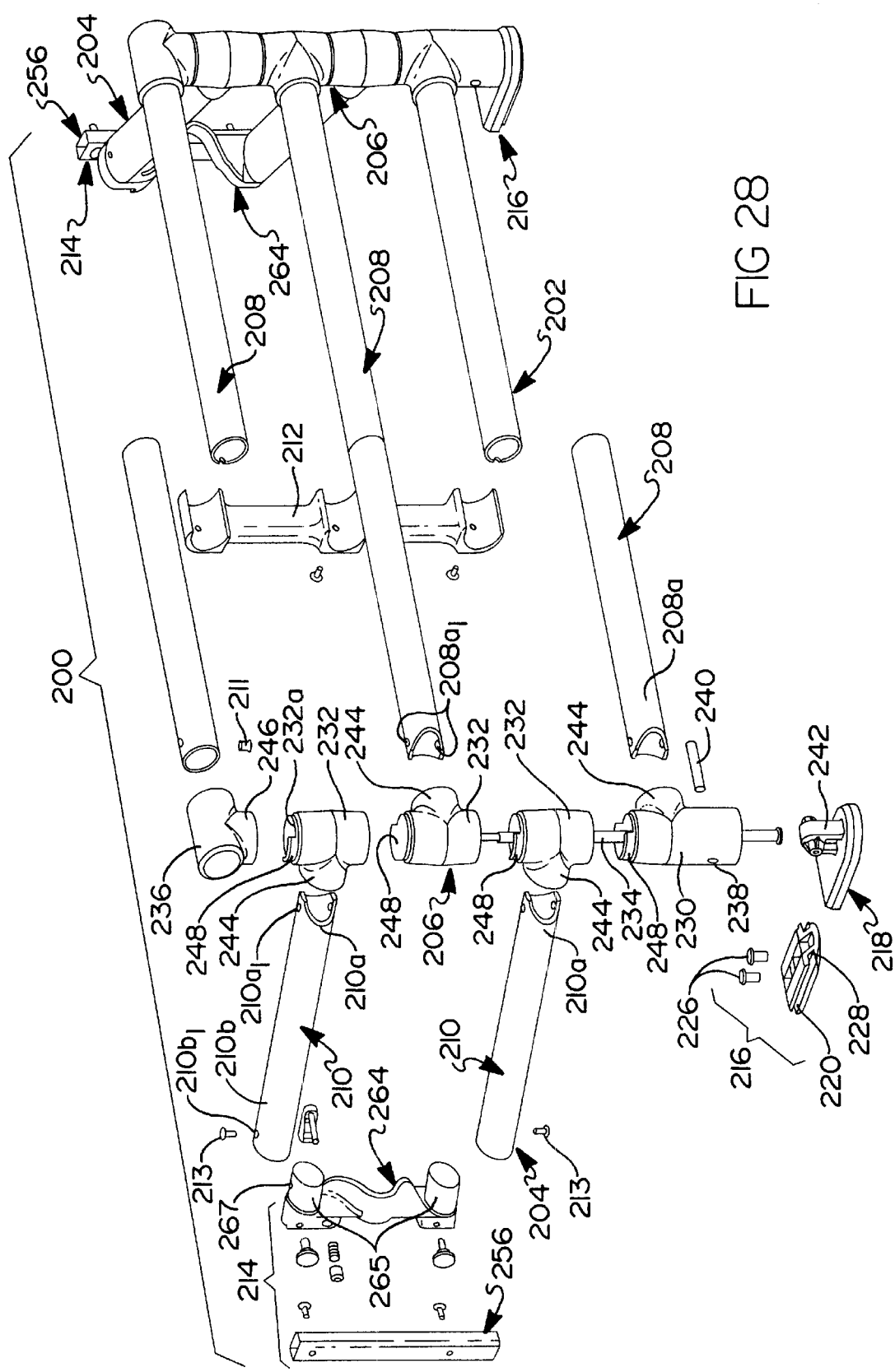
FIG. 28 is a exploded perspective view of a portion of the bed extender illustrating the construction of one of the uprights.

Referring further to FIGS. 26 and 28, a brace 212 is used to provide structural support to the main supports 208. Each end wall 204 further includes an end post assembly 214 for enabling each of the end walls 204 to be secured to the inside surface 36a of the sidewall 36 of the pickup truck bed 14. The uprights 206 are secured via mounting assemblies 216 to the inside surface 30 of the tailgate 12. It is a principal advantage of the bed extender 200 that the mounting assemblies 216 enable the uprights 206 to be slidingly removed from the tailgate 12 without any external tools or complex disassembly procedures. This feature will be explained in greater detail in the following paragraphs.

Figure 27:
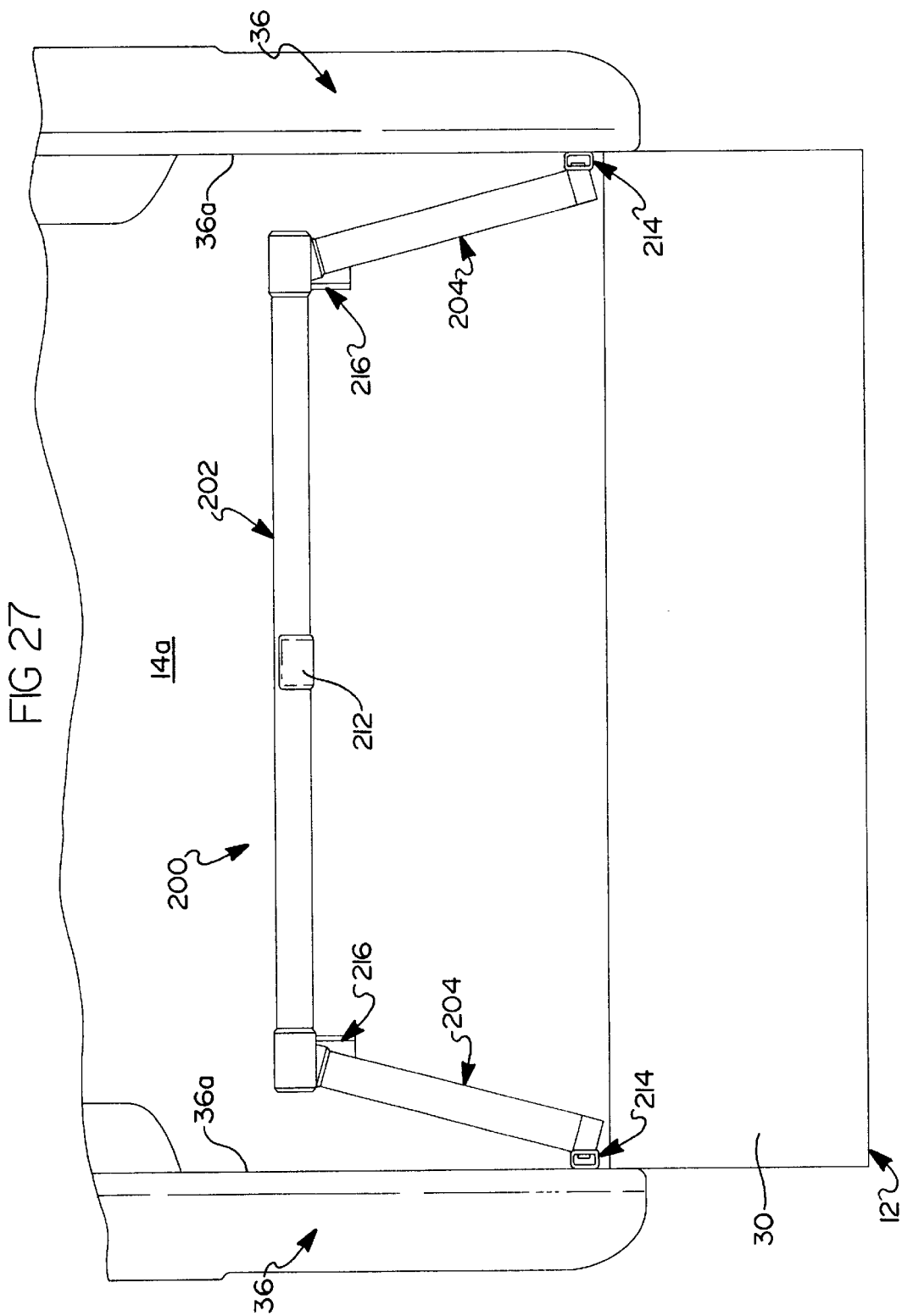
FIG. 27 is a plan view of the bed extender disposed in a cargo restraining position.

The bed extender 200 can be used to form a cargo securing function by removing it from engagement with the tailgate 12 and flipping it 180° into the position shown in FIG. 27. The end walls 204 are attached in identical fashion to the sidewalls 36 of the truck bed 14 while the uprights 206 are supported on the floor 14a of the truck bed 14.

Figure 29:
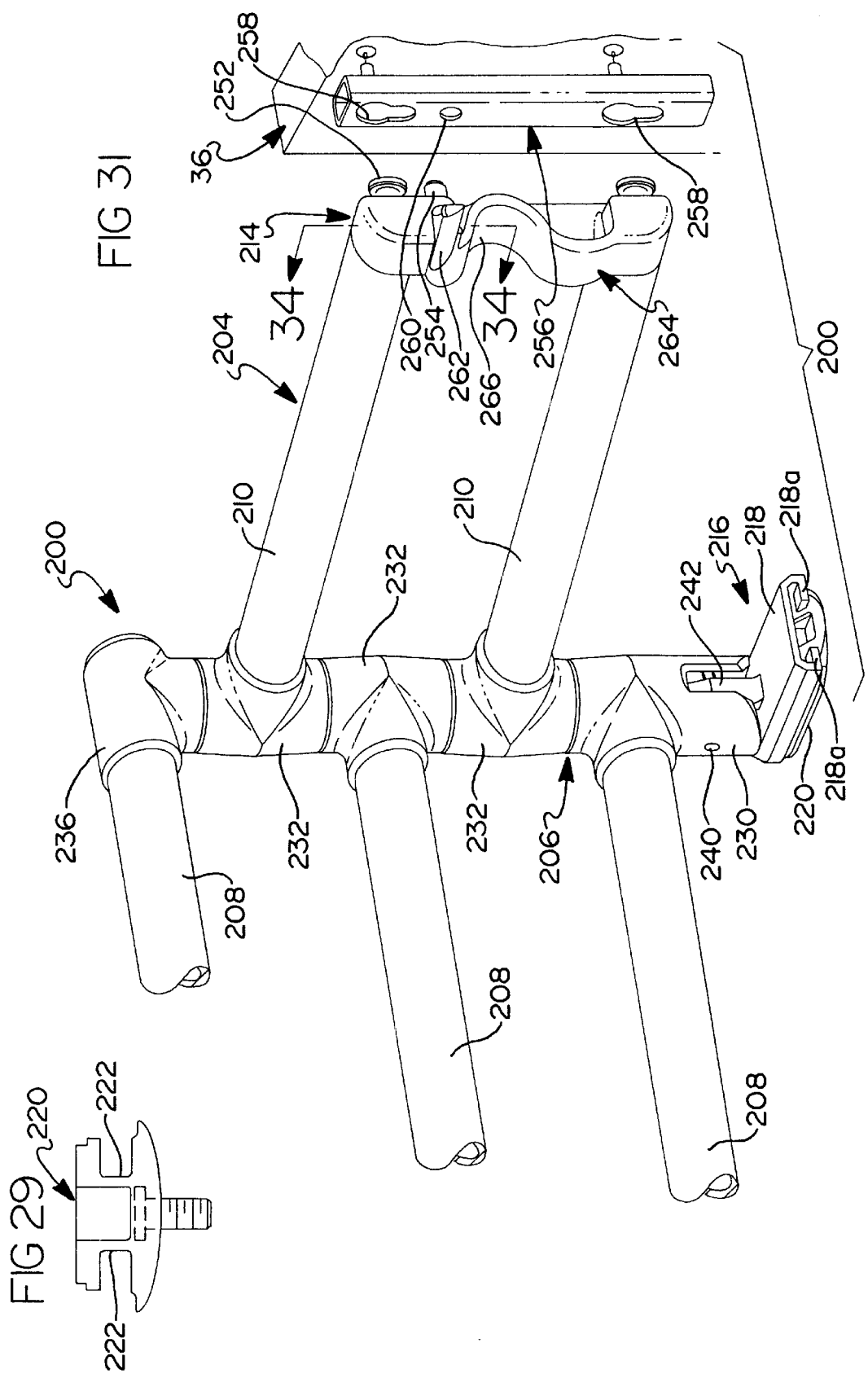
FIG. 29 is an end view of the second element of one of the support assemblies.
Figure 30:
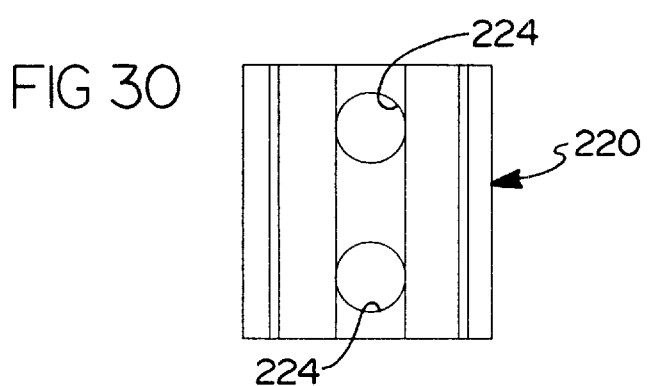
FIG. 30 is a plan view of the second element shown in FIG. 29.

With further reference to FIGS. 28, 29 and 30, each mounting assembly 216 can be seen to include a first mounting element 218 (FIG. 29) and a second mounting element 220 (FIG. 30). The second mounting element 220 is mounted directly to the inside surface 30 of the tailgate 12 and includes a pair of oppositely opening longitudinal channels 222 and a pair of openings 224. The openings 224 allow a pair of conventional rivnut fasteners 226 to be used to secure the second elements 220 directly to the inner surface 30 of the tailgate 12. The channels 222 engage with the shoulder portions 218a of the first element 218, as best seen in FIG. 31, to allow the first element 218 to be slidably secured to or removed therefrom quickly and easily without the use of any external tools.

With further reference to FIG. 28, each second element 220 further includes a tapered edge 228 which allows objects to be easily slid thereover when the bed extender 200 is not secured to the tailgate 12 and when objects, for example, sheets of plywood, are slid over the inside surface 30 of the tailgate. The first elements 218 can be rested directly on the floor 14a of the truck bed 14 when the bed extender 200 is used as a cargo restraining device, as shown in FIG. 27.

With further reference to FIG. 28, the construction of each upright 206 can also be seen in greater detail. Each upright includes a lower T-shaped fitting 230, a plurality of intermediate T-shaped fittings 232, a connecting rod 234 and a T-shaped cap 236. The connecting rod 234 secures the fittings 230, 232 and the cap 236 closely adjacent one another as can be seen with the right side upright 206 in FIG. 28. The lower T-shaped fitting 230 includes a throughbore 238 which allows a retaining pin 240 to be used to quickly secure the fitting 230 to an upstanding mounting post 242 of the first element 218. Outermost ends 208a of each of the main supports 208 have aligned holes $208a_1$. An uppermost one of main supports 208 includes a conventional riv-nut 211 inserted into one of its openings $208a_1$. One outermost end 210a of each of the end wall support members 210 similarly includes aligned openings $210a_1$. Each outermost end 210a is inserted into a neck portion 244 of each of the fittings 230 and 232 and secured thereto in vertically aligned fashion by the connecting rod which extends through each of the aligned openings $208a_1$ and $210a_1$. The upper T-shaped fitting 236 includes neck portion 246 which is coupled directly to an upper end 232a of the uppermost intermediate T-shaped fitting 232. The uppermost end of the connecting rod 234 (hidden from view in FIG. 28) is threaded and engages with riv-nut 211 to hold all of the main supports 208 and the end wall support members 210 to each upright 206.

The opposite ends 210b of each end wall support member 210 similarly have holes $210b_1$. A threaded fastening member 213 is used to secure each member 210 to neck portions 265 of a frame member 264 via openings 267 in the neck portions 265.

Another advantage of the bed extender 200 is that the end walls 204 are limited in their degree of pivoting movement by the construction of the T-shaped fittings 230, 232 and 236. As can be seen in FIG. 28, one end (i.e, an upper end) of each of the T-shaped fittings 230 and 232 includes an upstanding shoulder 248 extending partially around its associated fitting 232. With brief reference to FIG. 32, a lower end 232b of each intermediate T-shaped fitting 232 can be seen to include an inwardly protruding shoulder 250. The neck portion 246 of cap 236 similarly includes such a shoulder. This inwardly protruding shoulder 250 serves to limit rotational movement of the fittings 232 and the cap 236, and therefore its associated end wall 204, to a predetermined range. In one preferred embodiment this range is about 110°, but it will be appreciated that this range is merely exemplary.

Figures 32, 33:
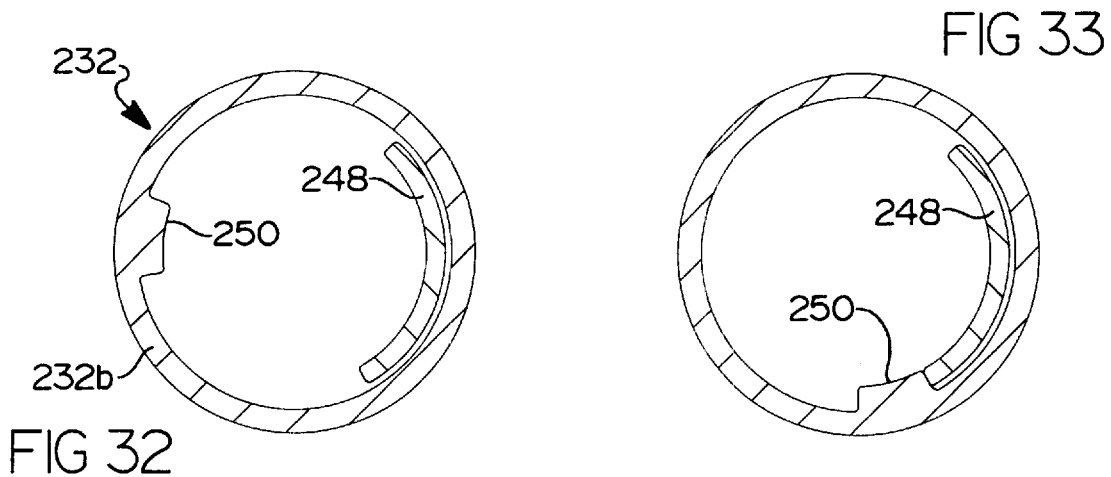
FIG. 32 is a partial cross-sectional view of the interconnection of two of the interengaged fittings of one of the uprights, taken in accordance with section line 32—32 in FIG. 35.
FIG. 33 is a partial cross-sectional view of the two interengaged fittings of FIG. 32, taken in accordance with section line 33—33 in FIG. 26.

FIG. 32 illustrates the orientations of the outwardly protruding shoulder 250 and the upwardly protruding shoulder 248 when the end wall 204 is in the closed position shown in FIG. 35. FIG. 33 illustrates how the upwardly protruding shoulder 248 limits rotational movement of the intermediate T-shaped fittings 232 to a maximum of about 110°, as shown in FIG. 28. This feature provides significant rigidity to the bed extender 200 when the bed extender is used in the cargo restraining mode shown in FIG. 27. In this mode, since the uprights 206 are not secured to the floor 14a of the truck bed 14, without the cooperating action of upstanding shoulder portions 248 and inwardly protruding shoulders 250, the center wall 202 could potentially have a tendency to move laterally within the truck bed 14. The interengagement of the shoulder portions 248 and 250 thus helps the center wall 202 and end walls 204 to form a rigid structure when the bed extender 200 is used in the cargo restraining mode.

Referring again to FIG. 31, the end post 214 associated with each end wall 204 will be described. Each end post 214 includes a lug 252 projecting therefrom and a spring loaded latching pin 254. The end post 214 is secured to a locking bar 256 which is secured by conventional fasteners to the inside wall 36a of the truck bed sidewall 36. The locking bar 256 includes a pair of key-shaped openings 258 and a central opening 260. The lugs 252 are positioned so that they can engage in the enlarged areas of key-shaped openings 258, and when the end wall 204 is lowered, the lugs 252 are secured to the smaller portions of each of the key-shaped openings 258. As the end wall 204 is lowered, the locking pin 254 is biased into engagement with the central opening 260. This prevents the end walls 204 from being inadvertently lifted or from bouncing upwardly while the bed extender 200 is in use.

Figure 34:
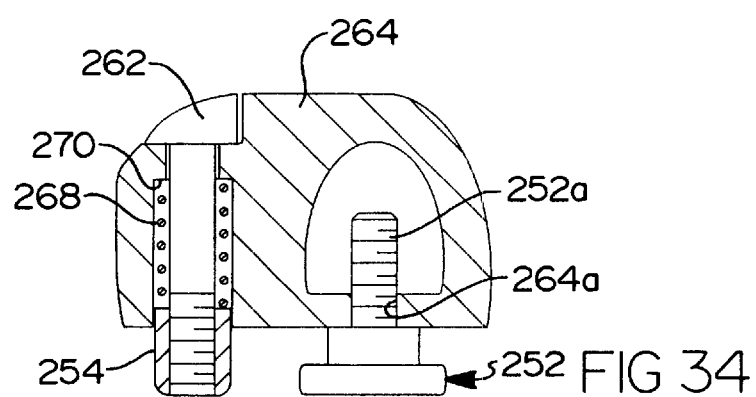
FIG. 34 is a cross sectional view of a portion of the frame, taken in accordance with section line 34—34 in FIG. 31.

With brief reference to FIG. 34, the locking pin 254 is biased by a spring 268 into the outwardly extending position shown in FIG. 34. The biasing element 268 is captured in a cavity 270 within the frame member 264. The lug 252 includes a threaded portion 252a which extends through a threaded opening 264a in the frame member 264.

To detach the end post 214 from the locking bar 256, a manually engageable handle 262 is provided. A user pulls outwardly on the handle 262 which retracts the locking pin 254. While the locking pin 254 is held in its retracted position, the entire end wall 204 can be lifted up slightly to align the lugs 252 with the enlarged portions of the key-shaped openings 258. The entire end wall 204 can then be pulled away from the locking bar 256. The frame member 264 of the end post 214 has a recessed area 266 which allows the end post 214 to be folded flush over one of the main supports 208 of the center wall 202, as shown in FIG. 35.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A bed extender apparatus for enlarging the effective cargo area of a bed of a pickup truck, comprising:
   a center wall having a length sufficient to extend along a major portion of a tailgate of said pickup truck;
   a pair of end walls pivotally secured to said center wall at opposite longitudinal ends of said center wall;
   at least one mounting assembly for pivotally and releasably securing said center wall to an inner wall of said tailgate;
   a securing assembly operably associated with one of said end walls for securing said one end wall to one of said sidewalls of said bed of said pickup truck; and
   wherein said mounting assembly enables said center wall to be detached from said tailgate, reoriented 180 degrees and resecured within said bed with said center wall resting within said bed forwardly of said end wall, and said securing assembly securing said one end wall to said sidewall, to thereby enable said bed extender to perform a cargo restraining function for articles placed inbetween said center wall and said tailgate.

2. The bed extender of claim 1, wherein said center wall includes a pair of uprights defining opposite longitudinal ends of said center wall.

3. The bed extender of claim 2, wherein said mounting assembly comprises a first element and a second element, and wherein said first element is operably associated with one of said uprights and said second element is fixedly secured to said inside surface of said tailgate; and
   wherein said first element is slidably engageable and disengageable with said second element.

4. The bed extender of claim 1, wherein said mounting assembly comprises a latching pin assembly, and
   wherein said mounting assembly is pivotally secured to a portion of said center wall such that pivotal movement of said center wall serves to actuate said latching pin assembly, thereby causing said latching pin assembly to be released from said first mounting element.

5. The bed extender of claim 1, wherein said center wall is pivotally mounted by said mounting assembly to said tailgate; and
   wherein said center wall can be folded down generally flush against said interior wall of said tailgate; and
   wherein said center wall includes a hold down assembly for securing said center wall in a folded orientation.

6. The bed extender of claim 1, wherein each of said end walls includes an end post;
   wherein said center wall includes a support member extending longitudinally between opposite ends thereof; and
   each said end post includes a recess positioned to receive said support member therein when said end walls are pivoted toward said center wall.

7. The bed extender apparatus of claim 1, wherein said uprights each comprise:
   a plurality of fittings interengaged with one another to form a tubular length spanning a height of said center wall;
   a rod extending through said fittings;
   wherein first ends of selected ones of said fittings each include an upstanding shoulder; and
   wherein second ends of selected ones of said fittings each include an inwardly protruding shoulder, said inwardly protruding shoulders engaging with said upstanding shoulders to limit pivotal movement of said end walls when said bed extender is in said cargo restraining orientation.

8. A cargo bed extender for use with a vehicle such as a pickup truck having a truck bed, said bed extender comprising:
   a center wall having a pair of uprights at opposite longitudinal ends thereof;
   a pair of end walls mounted pivotally to said uprights;
   a mounting assembly having a first mounting element secured to one of said uprights and a second element fixedly secured to an inside surface of a tailgate of said truck bed, wherein said first and second mounting elements are slidably engageable and disengageable with one another, and wherein said first mounting element is pivotally coupled to said upright;
   a pair of securing assemblies for releasably securing said end walls to interior wall portions of a pair of sidewalls of said truck bed;
   said end walls being foldable generally flush with said center wall when said end walls are not secured to said sidewalls, and said center wall being foldable generally flush against said inside surface of said tailgate when said bed extender is not in use;

wherein said upright can be completely detached from said second mounting element and reoriented 180 degrees such that said center wall is supported within said bed forwardly of said tailgate, thus enabling said bed extender to be used as a cargo restraining implement for articles positioned in said bed between said center wall and said tailgate when said tailgate is in a raised position.

9. The bed extender of claim 8, wherein said center wall comprises a hold down assembly; and wherein said inside surface of said tailgate comprises securing structure for engaging with said hold down assembly so that said center wall can be secured in a folded orientation against said inside surface of said tailgate when said bed extender is not in use.

10. The bed extender of claim 8, wherein said end walls each include an end post; and wherein each said end post includes a recess adapted to receive a portion of said center wall when said end posts are folded against said center wall, to thereby place said bed extender into a compact, folded orientation.

11. The bed extender of claim 8, wherein said center wall includes a plurality of longitudinal members;

wherein said end walls each include a plurality of end wall support members; and wherein said end wall support members reside inbetween said support members of said center wall when said end walls are folded onto said center wall, thereby forming a compact assembly when said bed extender is not in use.

12. The bed extender of claim 8, wherein said securing assembly includes:

a locking component secured to an inside surface of one of said sidewalls of said truck bed; and a latching pin assembly having a manually engageable plunger for releasing said latching pin assembly from engagement with said locking component.

13. The bed extender of claim 12, wherein said locking component comprises a locking bar secured to said inside surface of said one sidewall.

14. A bed extender for the bed of a vehicle such as a pickup truck, said bed extender comprising:

a center wall defined by a pair of uprights and a plurality of supports extending longitudinally perpendicularly between said uprights;

a pair of mounting assemblies disposed at lower ends of said uprights;

said mounting assemblies each comprising a first element secured to one of said lower ends and a second element secured to an inside wall surface of a tailgate of said vehicle, said first and second elements further being slidably engageable to releasably secure said uprights to said inside surface of said tailgate, and further enabling pivotal movement of said center wall between a position parallel to said inside wall surface and a position perpendicular to said inside wall surface of said tailgate;

a pair of end walls pivotally secured to said uprights;

a pair of securing assemblies associated with said end walls;

a second pair of mounting components secured to inner walls of each of a pair of sidewalls of said vehicle for releasably engaging said locking assemblies; and wherein said mounting assemblies enable said center wall to be detached from said tailgate, rotated 180 degrees and resecured such that said uprights rest within said truck bed forwardly of said tailgate and said securing assemblies secure said end walls to said mounting components, to thereby permit said bed extender to function as a cargo restraining device for articles disposed within said bed inbetween said center wall and said tailgate when said tailgate is in a raised position.

15. The bed extender of claim 14, further comprising a hold down assembly associated with said center wall for securing said center wall in a folded orientation against said inside wall surface of said tailgate.

16. The bed extender of claim 14, wherein each said securing assembly includes:

a locking component secured to an inside surface of one of said sidewalls of said truck bed; and a latching pin assembly having a manually engageable plunger for releasing said latching pin assembly from engagement with said locking component.

17. The bed extender of claim 16, wherein said locking component comprises a locking bar secured to said inside surface of said one sidewall.

18. The bed extender of claim 14, wherein said end walls each include an end post; and wherein each said end post includes a recess adapted to receive a portion of said center wall when said end posts are folded against said center wall, to thereby place said bed extender into a compact, folded orientation.

* * * * *